US010207380B2

(12) United States Patent
Billings et al.

(10) Patent No.: US 10,207,380 B2
(45) Date of Patent: Feb. 19, 2019

(54) POWER TOOL AND LIGHT UNIT

(71) Applicant: BLACK & DECKER INC., New Britain, CT (US)

(72) Inventors: Ross A. Billings, Reisterstown, MD (US); David Beers, Dallastown, PA (US); Andrew Birkel, Baltimore, MD (US); Daniel Amos Odean Hegarty, Baltimore, MD (US); Floyd E. Moreland, York, PA (US); David Muti, Nottingham, MD (US); Sandip Patel, Rosedale, MD (US); Kevin Wang, Suzhou (CN)

(73) Assignee: Black & Decker Inc., New Britain, CT (US)

( * ) Notice: Subject to any disclaimer, the term of this patent is extended or adjusted under 35 U.S.C. 154(b) by 51 days.

(21) Appl. No.: 15/373,965

(22) Filed: Dec. 9, 2016

(65) Prior Publication Data

US 2018/0161951 A1      Jun. 14, 2018

(51) Int. Cl.
| | |
|---|---|
| *B23Q 17/24* | (2006.01) |
| *B25B 23/18* | (2006.01) |
| *B25F 5/00* | (2006.01) |
| *F21S 9/02* | (2006.01) |
| *F21V 21/00* | (2006.01) |
| *F21V 23/04* | (2006.01) |
| *F21V 33/00* | (2006.01) |
| *B23Q 17/00* | (2006.01) |
| *B25F 5/02* | (2006.01) |

(52) U.S. Cl.
CPC ......... *B23Q 17/2404* (2013.01); *B23Q 17/00* (2013.01); *B25B 23/18* (2013.01); *B25F 5/00* (2013.01); *B25F 5/021* (2013.01); *F21S 9/02* (2013.01); *F21V 21/00* (2013.01); *F21V 23/0442* (2013.01); *F21V 23/0471* (2013.01); *F21V 33/008* (2013.01)

(58) Field of Classification Search
CPC ..... B23Q 17/2404; B25B 23/18; F21V 21/00; F21V 23/0442; F21V 23/0471; F21V 33/1008; F21S 9/102
USPC .......................... 362/183, 119, 120, 216, 89
See application file for complete search history.

(56) References Cited

U.S. PATENT DOCUMENTS

| | | |
|---|---|---|
| 2,855,679 A | 10/1958 | Gibble |
| 4,078,869 A | 3/1978 | Honeycutt |
| 4,480,295 A | 10/1984 | Shuster |

(Continued)

FOREIGN PATENT DOCUMENTS

| | | |
|---|---|---|
| DE | 102006045157 A1 | 4/2008 |
| DE | 102012209916 A1 | 12/2013 |

(Continued)

*Primary Examiner* — Laura Tso
(74) *Attorney, Agent, or Firm* — Caeden Drayton; Scott Markow

(57) ABSTRACT

A power tool (e.g., a pneumatic tool) includes a tool housing, a motor disposed in the tool housing, and a switch coupled to the tool housing and configured to control operation of the motor. A light unit includes a light unit housing removably coupleable to the tool housing. The light unit includes a light disposed in the light unit housing, a controller, and a sensor. The sensor is configured to sense actuation of the switch, and the controller is configured to cause the light to turn on when the sensor senses that the switch is actuated.

20 Claims, 27 Drawing Sheets

(56) References Cited

U.S. PATENT DOCUMENTS

| | | | |
|---|---|---|---|
| 6,206,538 B1* | 3/2001 | Lemoine | B25B 23/18 307/132 R |
| 6,511,201 B1* | 1/2003 | Elrod | B05B 1/005 124/56 |
| 6,921,235 B2 | 7/2005 | Chen | |
| 8,317,350 B2 | 11/2012 | Friedman et al. | |
| 8,328,381 B2 | 12/2012 | Dixon et al. | |
| 8,506,108 B2 | 8/2013 | Friedman et al. | |
| 8,820,955 B2 | 9/2014 | Dixon et al. | |
| 8,827,483 B2 | 9/2014 | Dixon et al. | |
| 9,028,088 B2 | 5/2015 | Vanko et al. | |
| 9,352,458 B2 | 5/2016 | Friedman et al. | |
| 2005/0152755 A1 | 7/2005 | Chen et al. | |
| 2005/0157489 A1* | 7/2005 | Oomori | B25B 23/18 362/119 |
| 2006/0176682 A1* | 8/2006 | Wu | B25H 1/0092 362/119 |
| 2008/0266845 A1 | 10/2008 | Wu et al. | |
| 2011/0058356 A1 | 3/2011 | Friedman et al. | |
| 2011/0188232 A1* | 8/2011 | Friedman | B25B 21/00 362/119 |
| 2013/0021783 A1* | 1/2013 | Vanko | B25F 5/021 362/119 |

FOREIGN PATENT DOCUMENTS

| | | | |
|---|---|---|---|
| EP | 2199024 A1 | 6/2010 | |
| EP | 2551066 A1 | 1/2013 | |

* cited by examiner

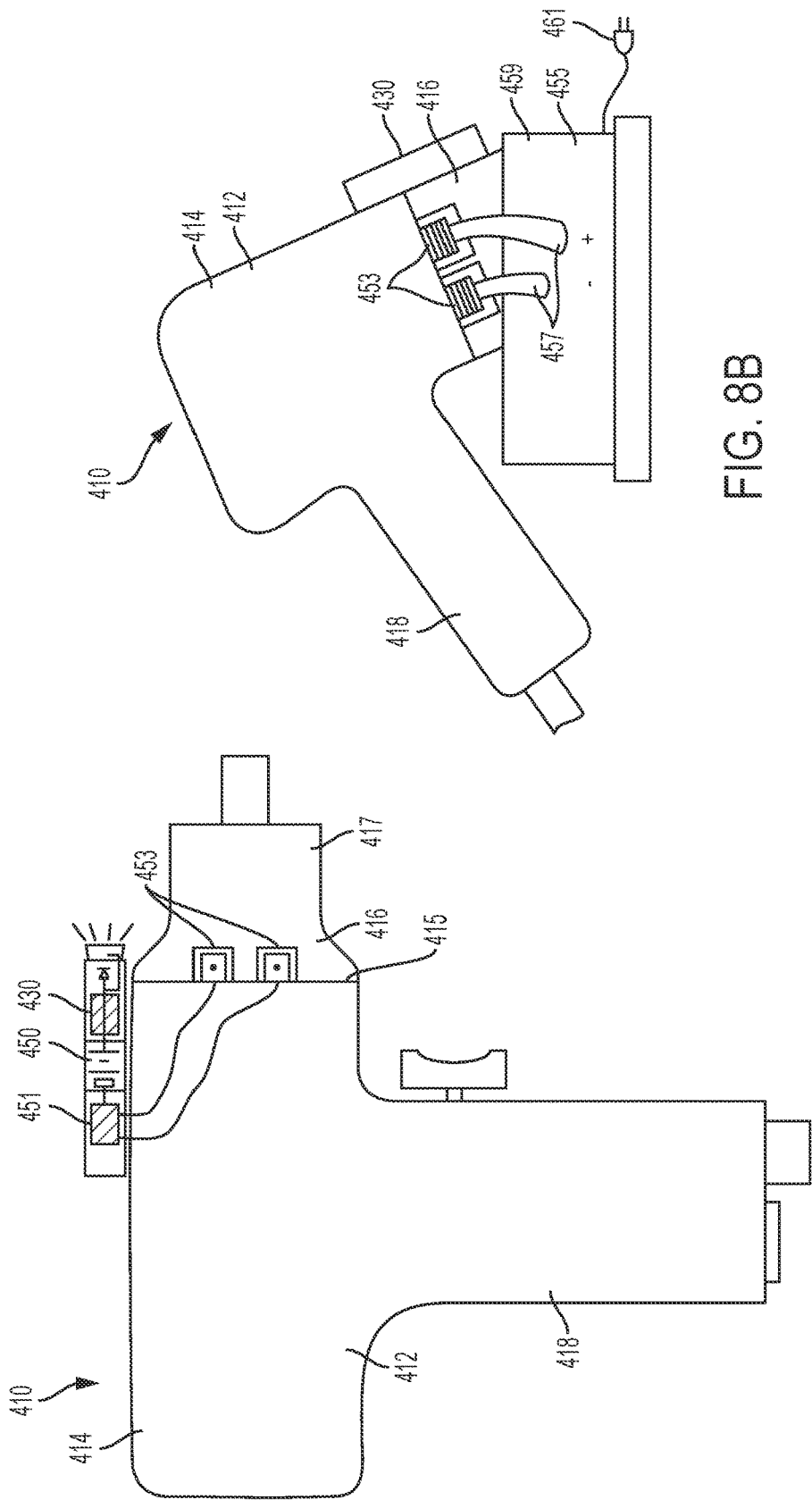

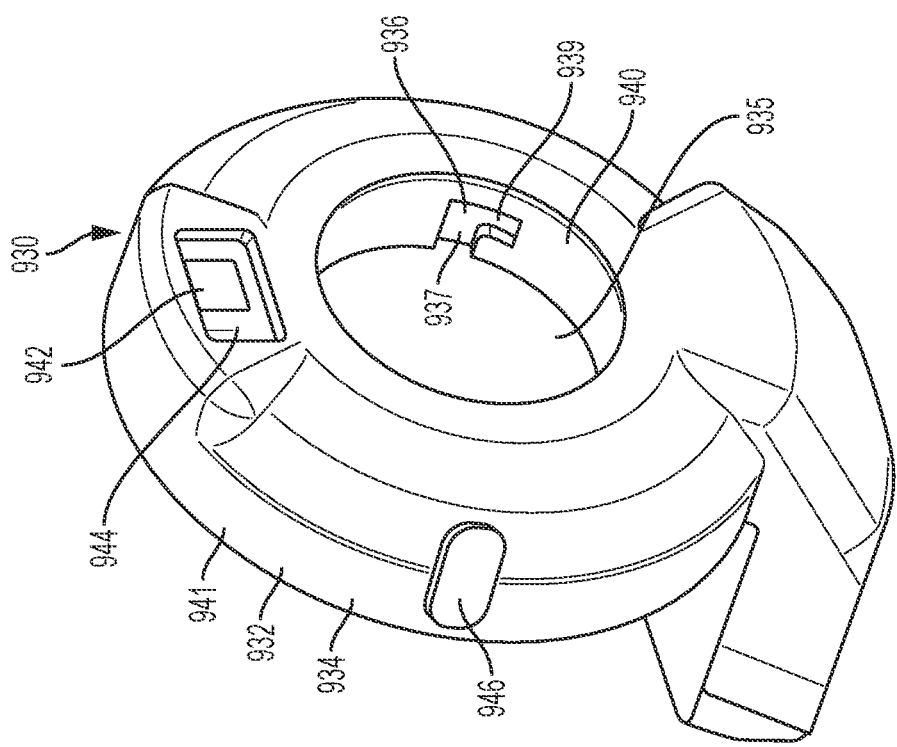
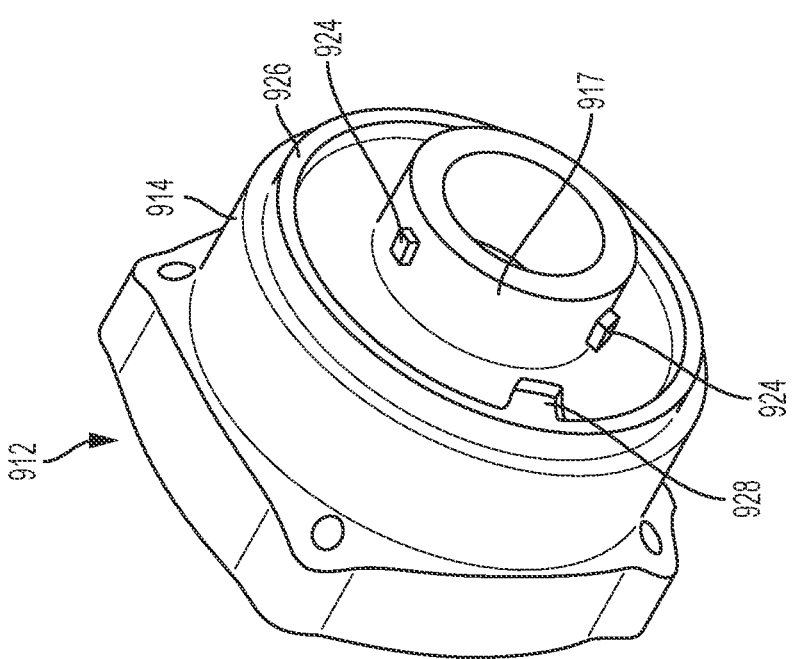

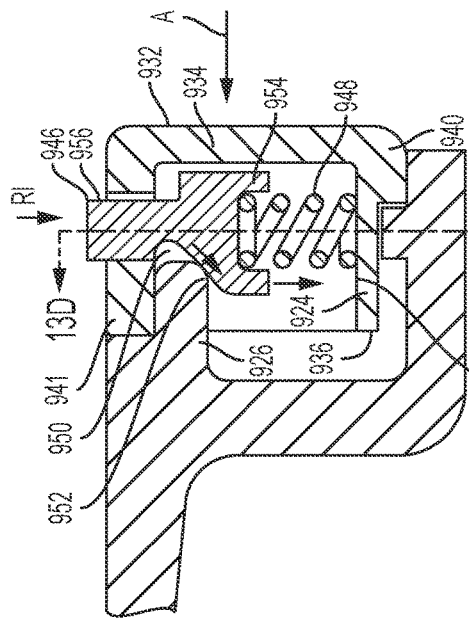
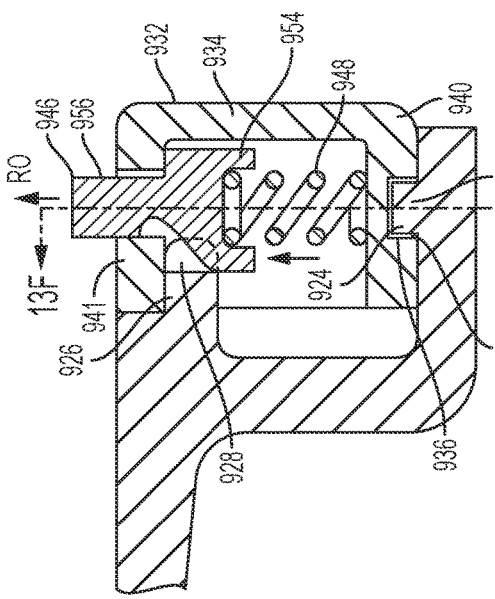
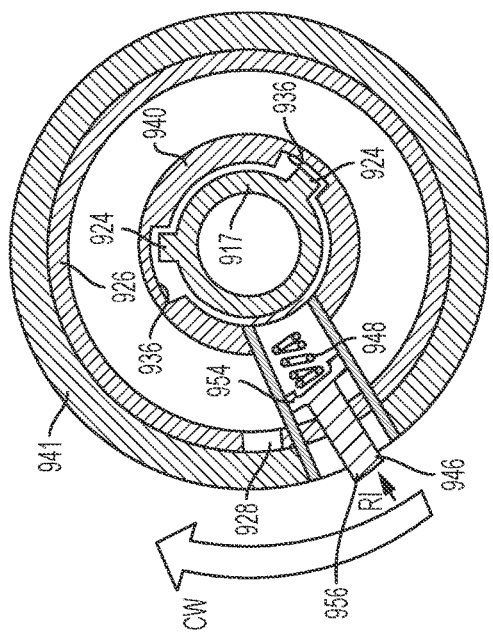
FIG. 13D
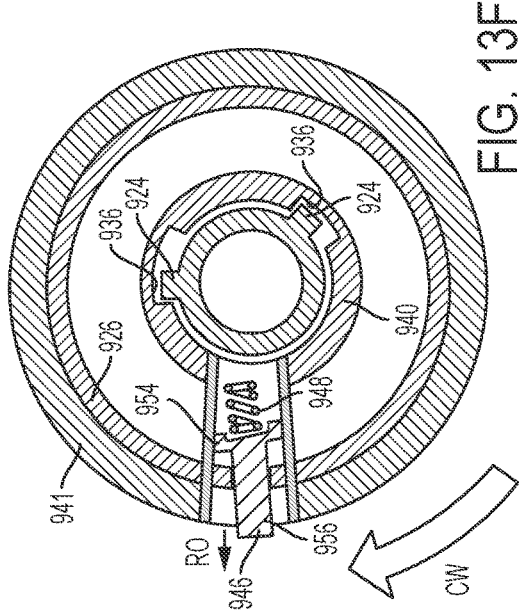
FIG. 13F
FIG. 13E
FIG. 13G

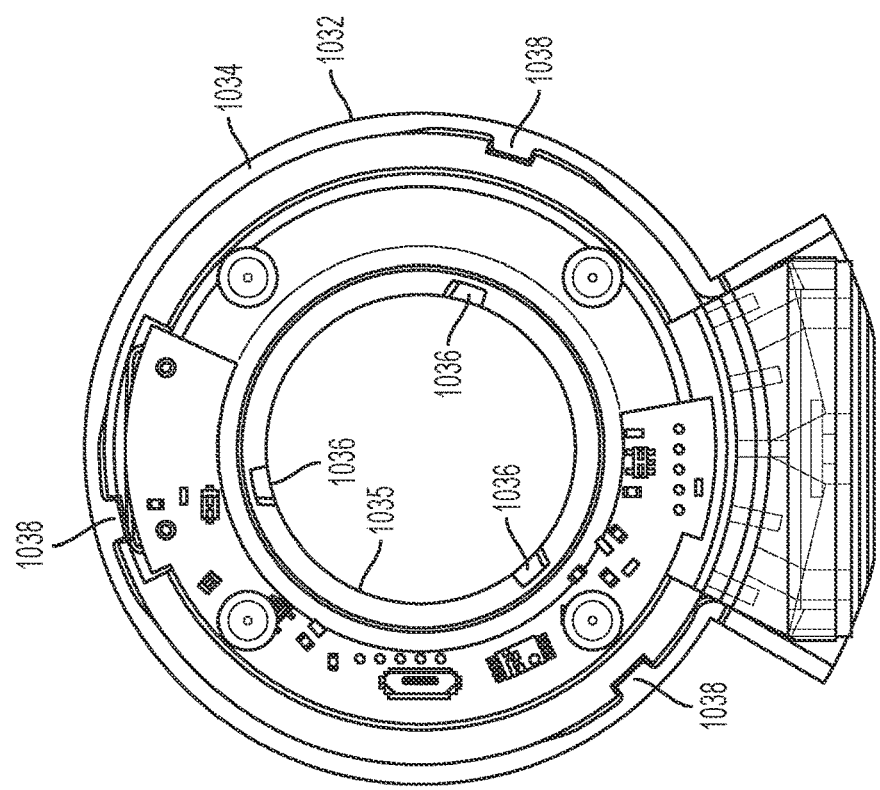
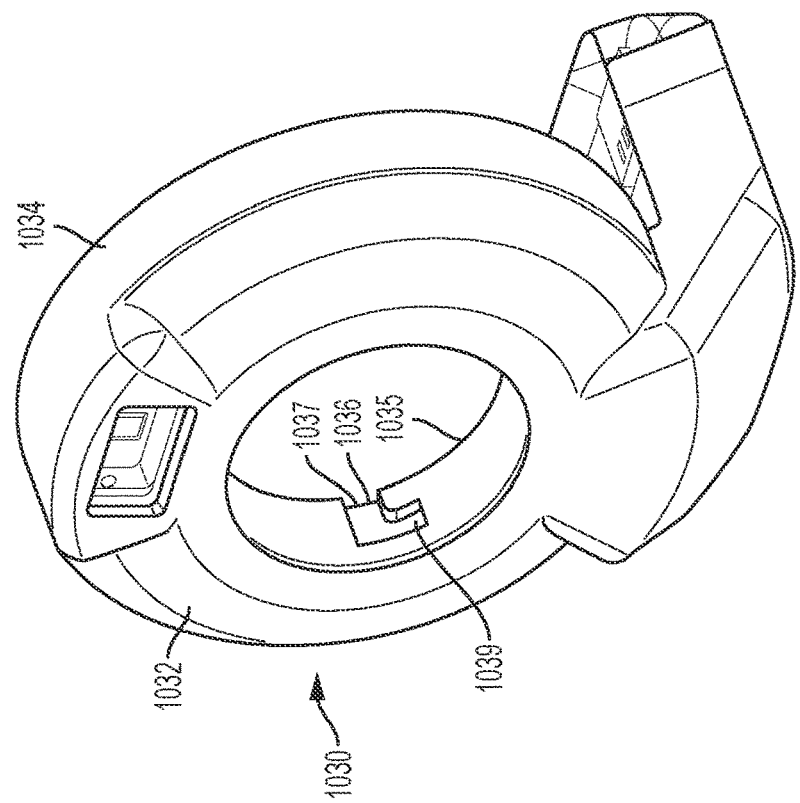
FIG. 14B
FIG. 14A

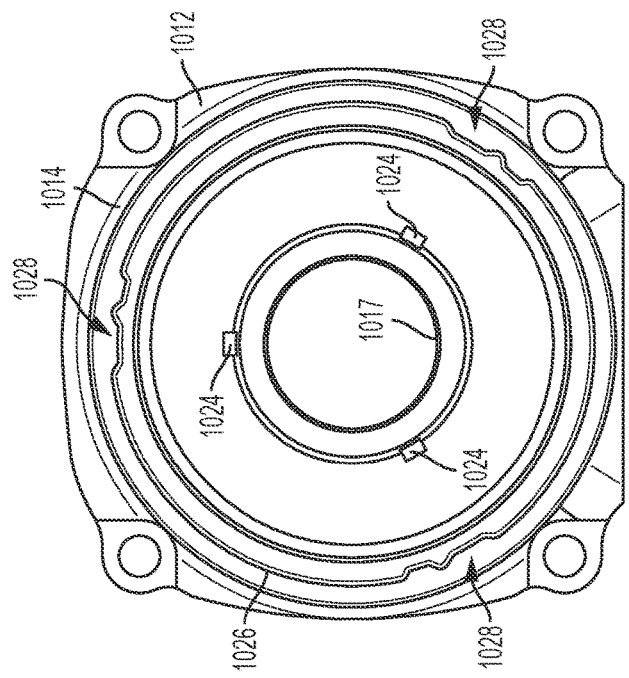
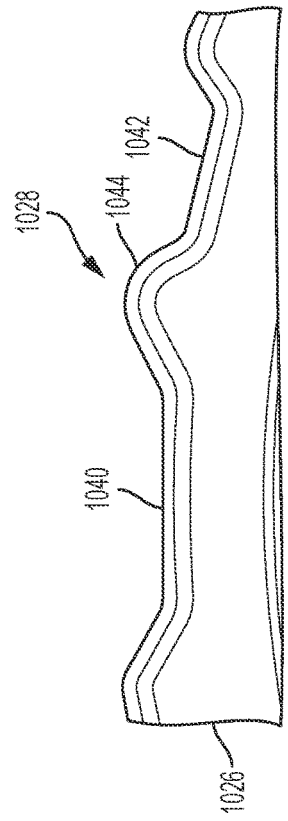
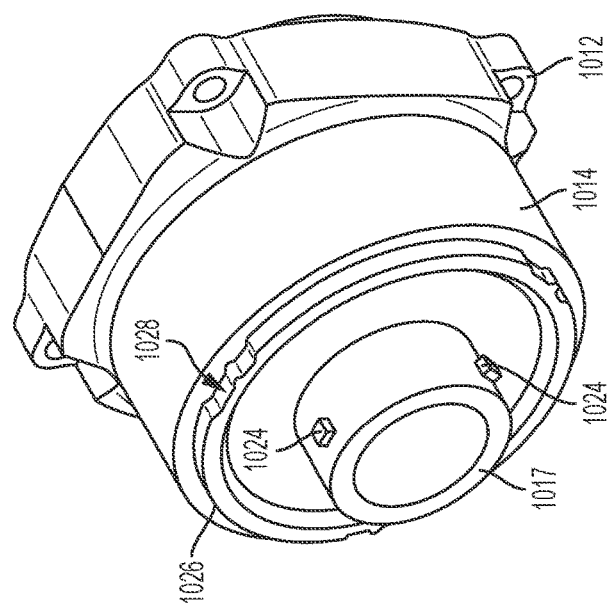
FIG. 14D
FIG. 14E
FIG. 14C

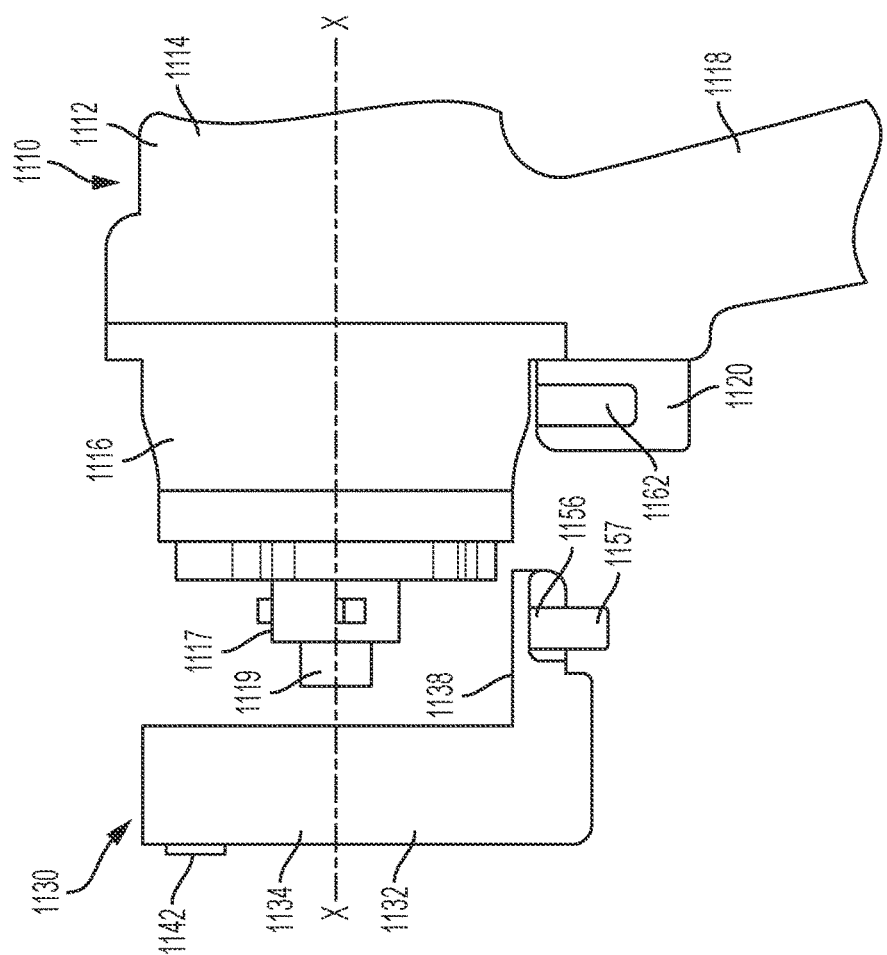
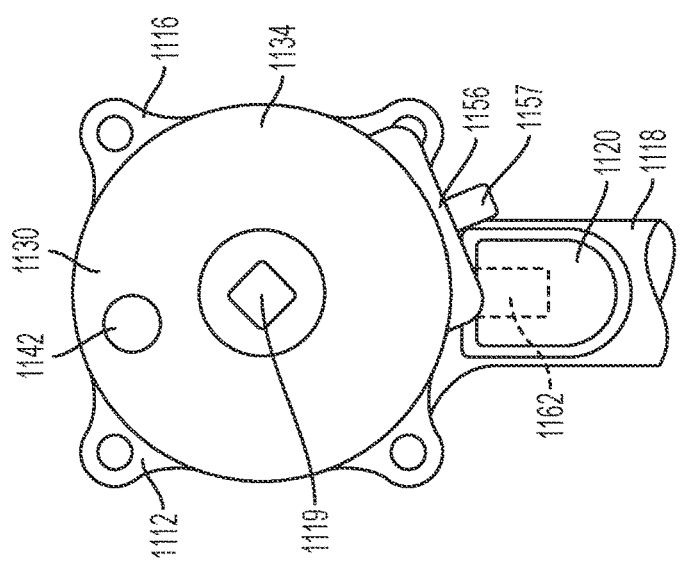
FIG. 15B
FIG. 15A

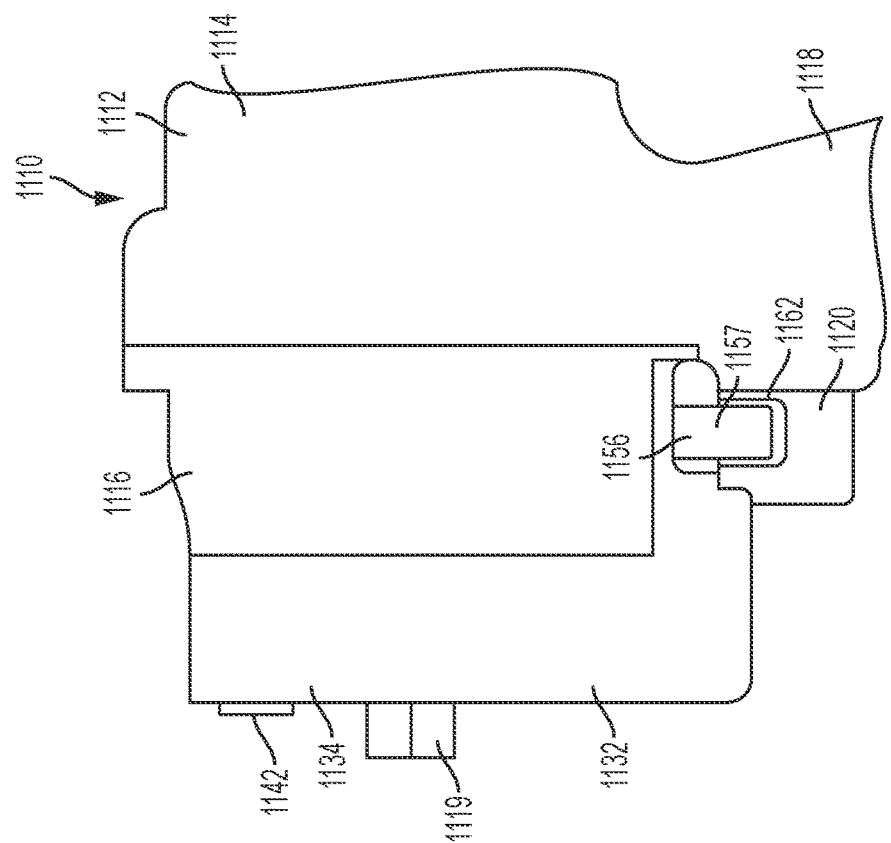
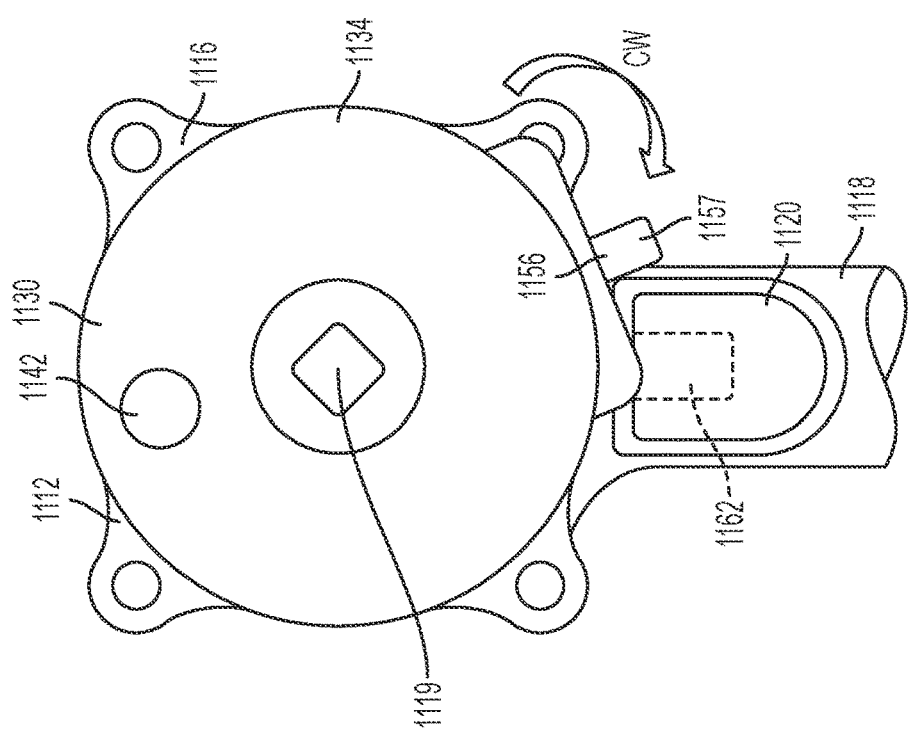
FIG. 15D
FIG. 15C

POWER TOOL AND LIGHT UNIT

TECHNICAL FIELD

This application relates to a power tool and a light unit, e.g., a pneumatic power tool with a removable light unit.

BACKGROUND

Power tools may be used in areas where operation would be enhanced by additional lighting. Some power tools have integral light units for providing illumination. The integral light units may be powered by the same electrical power supply (e.g., a battery or an AC power supply) that powers the power tool. Operation of the light unit may be controlled by a switch that controls electrical power delivery to the power tool and/or by a separate switch. Pneumatic power tools are also used in many applications where additional lighting is desirable. Pneumatic power tools generally do not include an electrical power supply needed to power a light unit.

SUMMARY

In an aspect, a light unit for a tool comprises a light unit housing removably coupleable to a tool housing, a light disposed in the light unit housing, a sensor disposed in the light unit housing and configured to sense actuation of the tool by a user to perform an operation, and a controller coupled to the sensor and the light and configured to cause the light to turn ON when the sensor senses that the tool is actuated.

Implementations of this aspect may include one or more of the following features. The light unit housing may be removably coupled to the tool housing by a bayonet connection so that the light unit housing is rotatable between an unlocked position and a locked position. The light unit housing further may include a locking mechanism configured to maintain the light unit housing in the locked position. The locking mechanism may include at least one of a leaf spring, a locking tab, and a button configured to be received in a recess. The light may include one or more LEDs. The sensor may include a Hall sensor configured to sense movement of a magnet coupled to the switch of a tool, a toggle switch or a pressure switch configured to sense movement of the switch of the tool, or a motion sensor configured to sense a motion initiated by actuation of the tool (e.g., a gyroscopic sensor configured to sense vibration or movement of the tool when the tool is actuated). The controller may include a timer configured to keep the light ON for a predetermined time period after the switch has been actuated or deactivated. A battery (e.g., a rechargeable battery) may be disposed in the light unit housing and may be configured to power the light, the sensor, and the controller. A USB port or one or more electrical contacts may be configured to provide power for recharging the battery.

In another aspect, a light unit for a pneumatic tool includes a housing coupleable to a pneumatic tool, a light disposed in the housing, a sensor disposed in the housing and configured to sense actuation of a switch on the tool by a user to control delivery of fluid to the pneumatic tool, and a controller coupled to the sensor and the light and configured to cause the light to turn on when the sensor senses that the switch is actuated.

Implementations of this aspect may include one or more of the following features. The light unit housing may be removably coupled to the tool housing by a bayonet connection so that the light unit housing is rotatable between an unlocked position and a locked position. The light unit housing further may include a locking mechanism configured to maintain the light unit housing in the locked position. The locking mechanism may include at least one of a leaf spring, a locking tab, and a button configured to be received in a recess. The light may include one or more LEDs. The sensor may include a Hall sensor configured to sense movement of a magnet coupled to the switch of a tool, a toggle switch or a pressure switch configured to sense movement of the switch of the tool, or a motion sensor configured to sense a motion initiated by actuation of the tool (e.g., a gyroscopic sensor configured to sense vibration or movement of the tool when the tool is actuated). The controller may include a timer configured to keep the light ON for a predetermined time period after the switch has been actuated or deactivated. A battery (e.g., a rechargeable battery) may be disposed in the light unit housing and may be configured to power the light, the sensor, and the controller. A USB port or one or more electrical contacts may be configured to provide power for recharging the battery.

In another aspect, a pneumatic tool comprises a tool housing, a pneumatic motor disposed in the tool housing, and a switch coupled to the tool housing and configured to control delivery of fluid to the pneumatic motor. A light unit housing is coupleable to the tool housing. A light is disposed in the light unit housing. A sensor is disposed in the light unit housing and is configured to sense actuation of the switch. A controller is coupled to the sensor and the light and configured to cause the light to turn on when the sensor senses that the switch is actuated.

Implementations of this aspect may include one or more of the following features. The light unit housing may be removably coupled to the tool housing by a bayonet connection. The light unit housing further may include a locking mechanism configured to maintain the light unit housing in a locked position on the tool housing. The locking mechanism may include at least one of a leaf spring, a locking tab, and a button configured to be received in a recess. The light may include one or more LEDs. A sensor target may be coupled for movement with the switch on the tool. The sensor may include a Hall sensor and the sensor target may include a magnet. Alternatively, the sensor may include a toggle switch or a pressure switch and the sensor target comprises a portion of the switch on the tool that engages the toggle switch or the pressure switch. The sensor may include a motion sensor configured to sense a motion initiated by actuation of the tool (e.g., a gyroscopic sensor configured to sense vibration or movement of the tool when the tool is actuated). The controller may include a timer configured to keep the light ON for a predetermined time period after the switch has been actuated or deactivated. A battery (e.g., a rechargeable battery) may be disposed in the light unit housing and may be configured to power the light, the sensor, and the controller. A USB port or one or more electrical contacts may be configured to provide power for recharging the battery.

Advantages may include one or more of the following. The light unit may be removable from a power tool. The light unit may have its own rechargeable battery so that it is usable with a pneumatic power tool. The light unit may turn on the light ON automatically when sensing when the tool is actuated by a user. These and other advantages and features will be apparent from the description, the drawings, and the claims.

BRIEF DESCRIPTION OF THE DRAWINGS

FIGS. 8A and 8B are side views of an embodiment of a power tool, a light unit, and a charger.

FIGS. 13A-13B are perspective views of another embodiment of a locking mechanism for a power tool and a light unit.

FIGS. 13C-13G are cross-sectional views of the locking mechanism of FIGS. 13A-13B.

FIGS. 14A and 14C are perspective views of another embodiment of a locking mechanism for a power tool and a light unit.

FIGS. 14B and 14D are end views of the locking mechanism of FIGS. 14A and 14C.

FIG. 14E is a close up view of the locking mechanism of FIG. 14D.

FIGS. 15A-15H are front and side views of another embodiment of a power tool and a light unit.

DETAILED DESCRIPTION

Figure 1B:
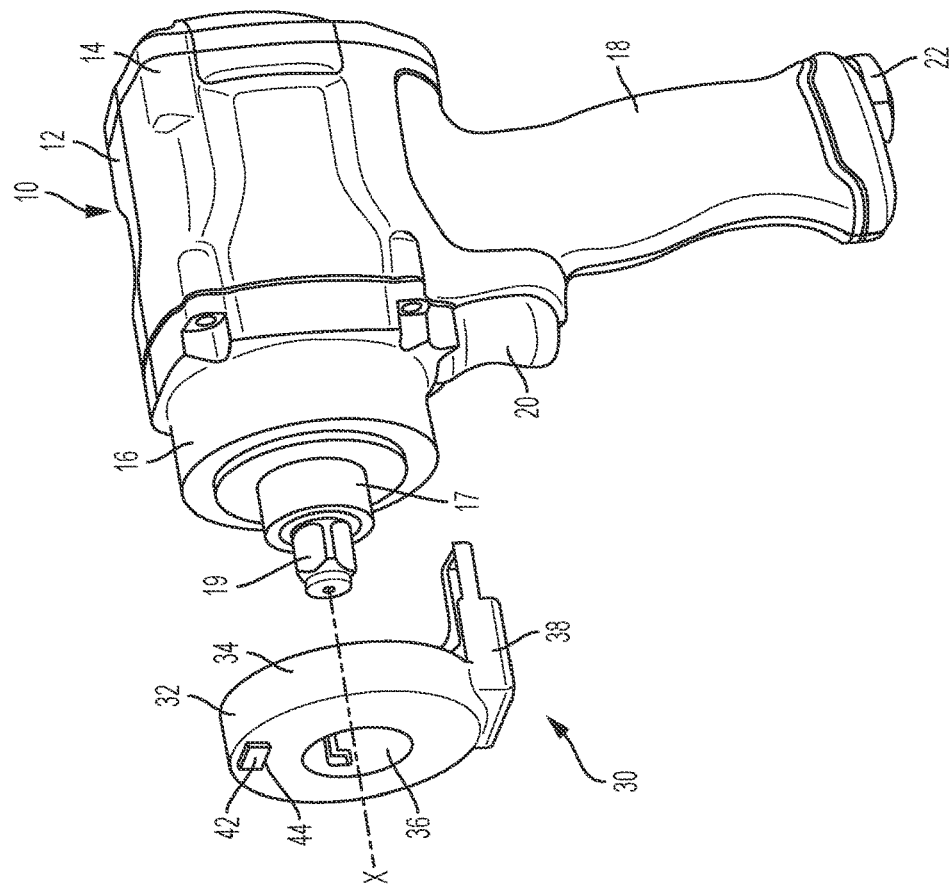
FIG. 1B is a perspective view of the power tool and light unit of FIG. 1 with the light unit removed.
Figure 1A:
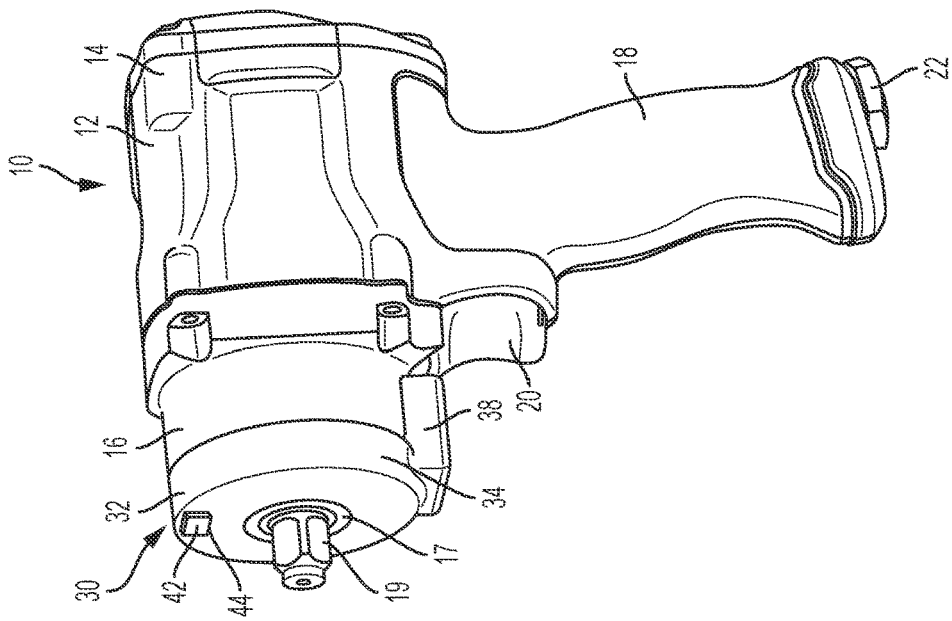
FIG. 1A is perspective view of an embodiment of a power tool and a light unit.

FIGS. 1A and 1B illustrate an embodiment of a power tool 10 and a removable light unit 30. In this embodiment, the power tool 10 is a pneumatic tool (in this case a pneumatic impact wrench) that is operable by compressed fluid, such as air. However, it should be understood that the power tool can comprise any one of numerous other types of power tools such as other pneumatic power tools (e.g., pneumatic drills, impact drivers, grinders, saws, hammers, etc.) or electric (e.g., battery or AC powered) power tools (e.g., drills, impact drivers, impact wrenches, impact drivers, saws, hammers, etc.). The power tool 10 includes a power tool housing 12 that includes a rear portion 14 containing a motor (not shown; in this case a pneumatic motor), a front portion 16 containing a transmission and/or impact mechanism (not shown), and a smaller diameter nose portion 17 extending forward from the front portion 16. An output member 19 (in this case a square drive shaft) is driven by the motor and the transmission and/or impact mechanism and extends outward from the nose portion 17 of the power tool housing 12 along an axis X. A handle 18 extends downward from the power tool housing 12 and includes a switch or trigger 20 configured to be depressed by a user to control delivery of fluid to the motor (or electric power in the case of an electric tool) to control operation of the tool 10. At the bottom of the handle 1 is an air inlet 22 configured to receive input of compressed fluid, e.g., from a compressor.

The light unit 30 includes a light unit housing 32 having an annular portion 34 with a central opening 36 that is concentric with the axis X. The light unit housing 32 also includes a flange portion 38 extending rearward from the annular portion 34 toward the tool housing, parallel to and offset from the axis X. The light unit housing 32 is removably coupleable to the tool housing 12 with the annular portion 34 receivable over the nose portion 17 and the flange portion 38 disposed below the front portion 16 and adjacent the switch 20, between the front portion 16 and the switch 20. The light unit housing 32 may be lockably coupled to the tool housing 12, e.g., according to me or more of the embodiments described below.

Figure 2:
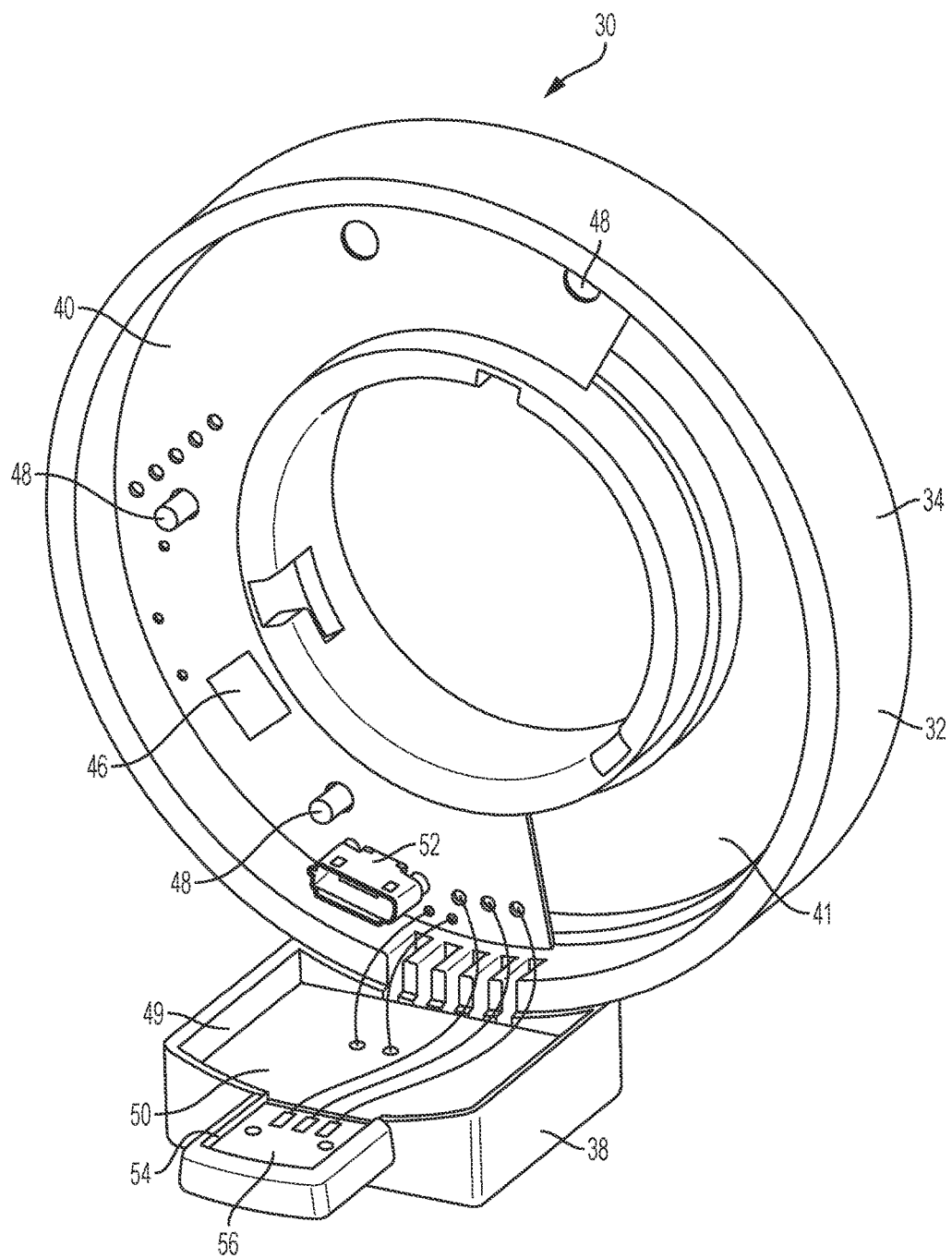
FIG. 2 is a perspective view of a rear side of the light unit of FIG. 1.

Referring also to FIG. 2, an annular or partially annular printed circuit board (PCB) 40 is received in a groove 41 in the annular portion 34 of the light unit housing 32. As shown in FIGS. 1A and 1B, mounted to a front side of the PCB 40 is a light 42 (e.g., one or more LEDs). The LEDs are covered by a lens or transparent or translucent cover 44 to protect the light 42 from dust and debris. As shown in FIG. 2, also mounted to the PCB 40 is a controller 46 (e.g., a processor, a microprocessor, and/or a digital or analog control circuit) that controls power delivery to and illumination of the light 42. The PCB 40 may also include other electrical circuit components (e.g., a DC power supply, various resistors, capacitors, diodes, and transistors, etc.) for controlling the light 42 and other light unit components, as will be well known to one of ordinary skill in the art. The PCB 40 may be heat staked to the light unit housing 32 by heat meltable protrusions 48. In other embodiments, the PCB may be attached to the light unit housing by one or more screws, snaps, or rivets.

Received in a front pocket 49 in the flange portion 38 is a battery 50 that is configured to provide electrical power to the light 42. In the illustrated embodiment, the battery 50 is a rechargeable lithium ion pouch battery. However, it should be understood that the battery 50 may be any type of rechargeable or non-rechargeable battery, such as a lithium-ion cylindrical cell, a nickel-cadmium battery, a coin cell, or an alkaline battery. Coupled to the PCB is a charging port 52 (e.g., a USB or micro-USB port) configured to receive a charger cable or input (e.g., a USB or micro-USB cable) for charging the battery 50. The PCB may include a charging circuit (not shown) configured to control the charging and discharging of the battery 50.

Figure 3:
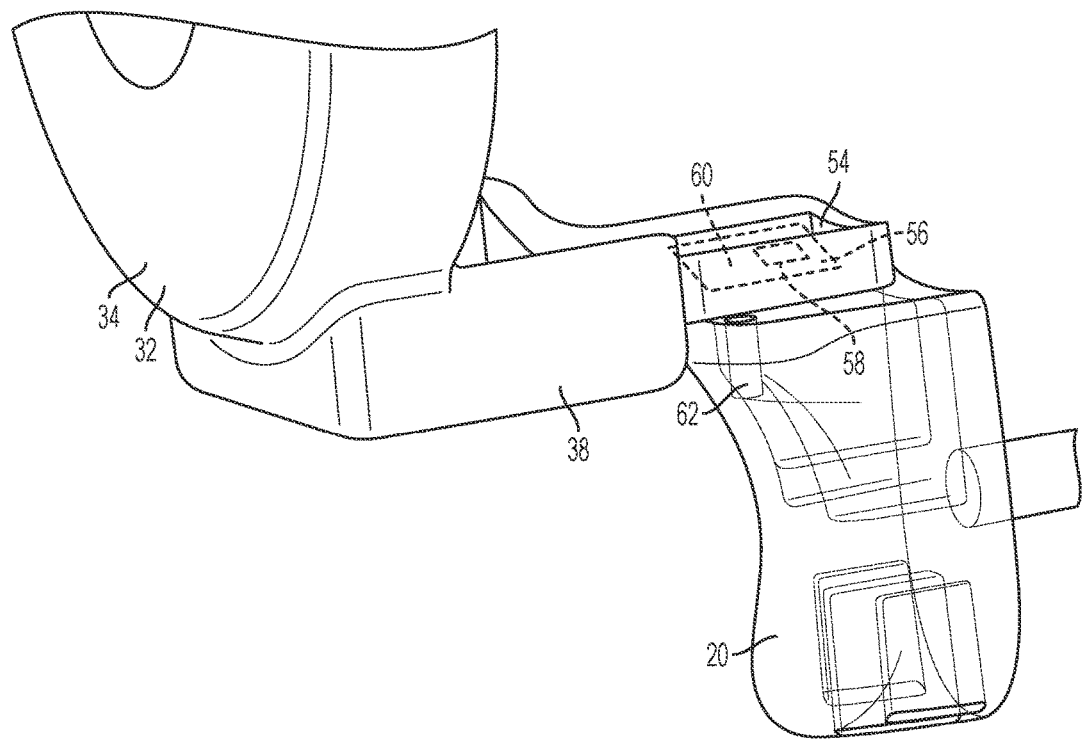
FIG. 3 is a perspective view of a portion of the light unit and a switch of the power tool of FIG. 1.

Referring also to FIG. 3, a sensor 56 is received in a rear pocket 54 of the flange portion 38 for sensing movement of the switch or trigger 20. In this embodiment, the sensor 56 comprises a Hall sensor 58 mounted to a Hall board 60. The switch 20 includes a sensor target 62, e.g., a permanent magnet. The sensor 56 is configured to sense the position of the sensor target 62 as the switch or trigger 20 is moved between a fully actuated position and a fully deactivated position. For example, the sensor 56 may generate an output electrical signal to the controller 46 corresponding to a strength of a magnetic field generated by the sensor target 62. The strength of this magnetic field may correlate with a position of the sensor target 62 (and thus of the switch or trigger 20) relative to the sensor 56.

Figure 4:
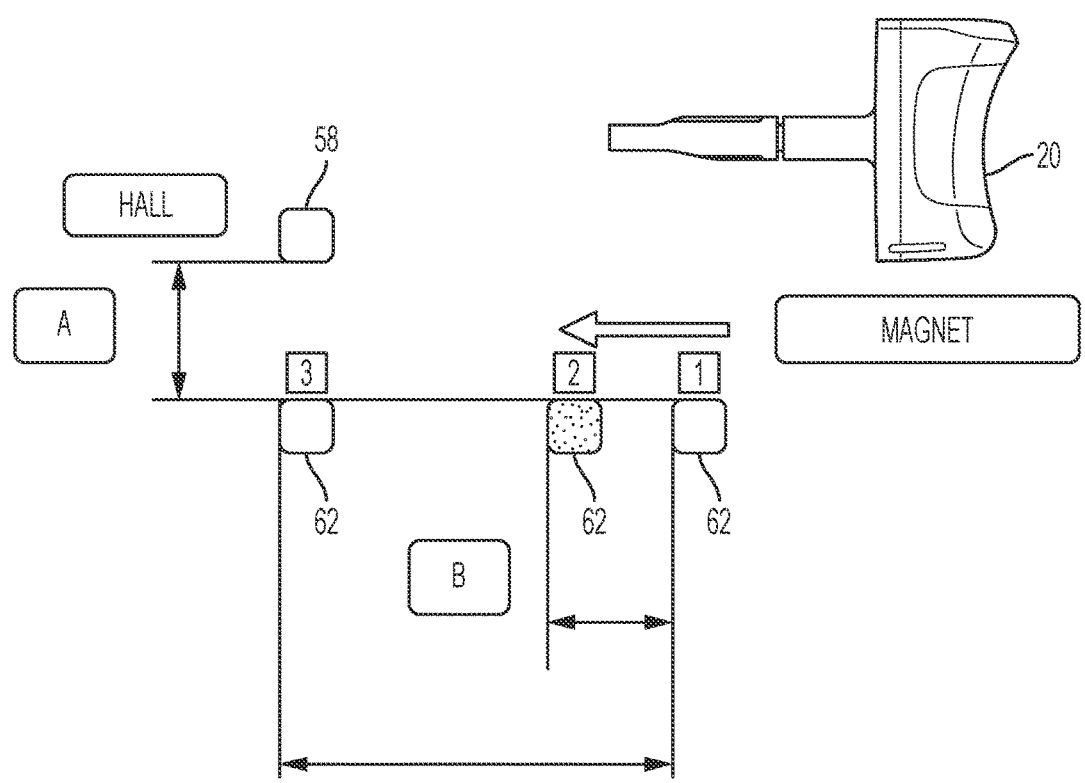
FIG. 4 is a schematic diagram illustrating operation of the switch of FIG. 3.

Referring also to FIG. 4, as the switch or trigger 20 is actuated or depressed, the magnet moves from position 1 to position 2 and then to position 3. At position 1, the light is OFF and the tool is OFF (i.e., the valve that controls fluid delivery to the motor is closed). When the switch or trigger 20 is actuated a small distance to position 2, the valve is either not yet open, so the tool remains OFF, or is only open by a small amount, while the Hall sensor 58 senses a change in the magnetic field and transmits a signal to the controller 46 indicating that the switch or trigger 20 has been actuated, and the controller 46 causes the light 42 to turn ON. When the switch is actuated a larger distance to position 3, the light remains ON and the valve opens to deliver fluid to the motor so that the tool is also ON. The tool remains ON until the switch or trigger 20 is deactivated or released to position 2. The light remains ON until the switch until the switch or trigger 20 is deactivated or released to position 1. In an alternative embodiment, the controller may have or be programmed with a timer that causes the light to remain ON for a predetermined period of time after the switch 20 has been actuated or deactivated. Examples of such timer features can be found in, e.g., U.S. Pat. Nos. 6,511,200 and 9,225,275, which are incorporated by reference.

Figure 5:
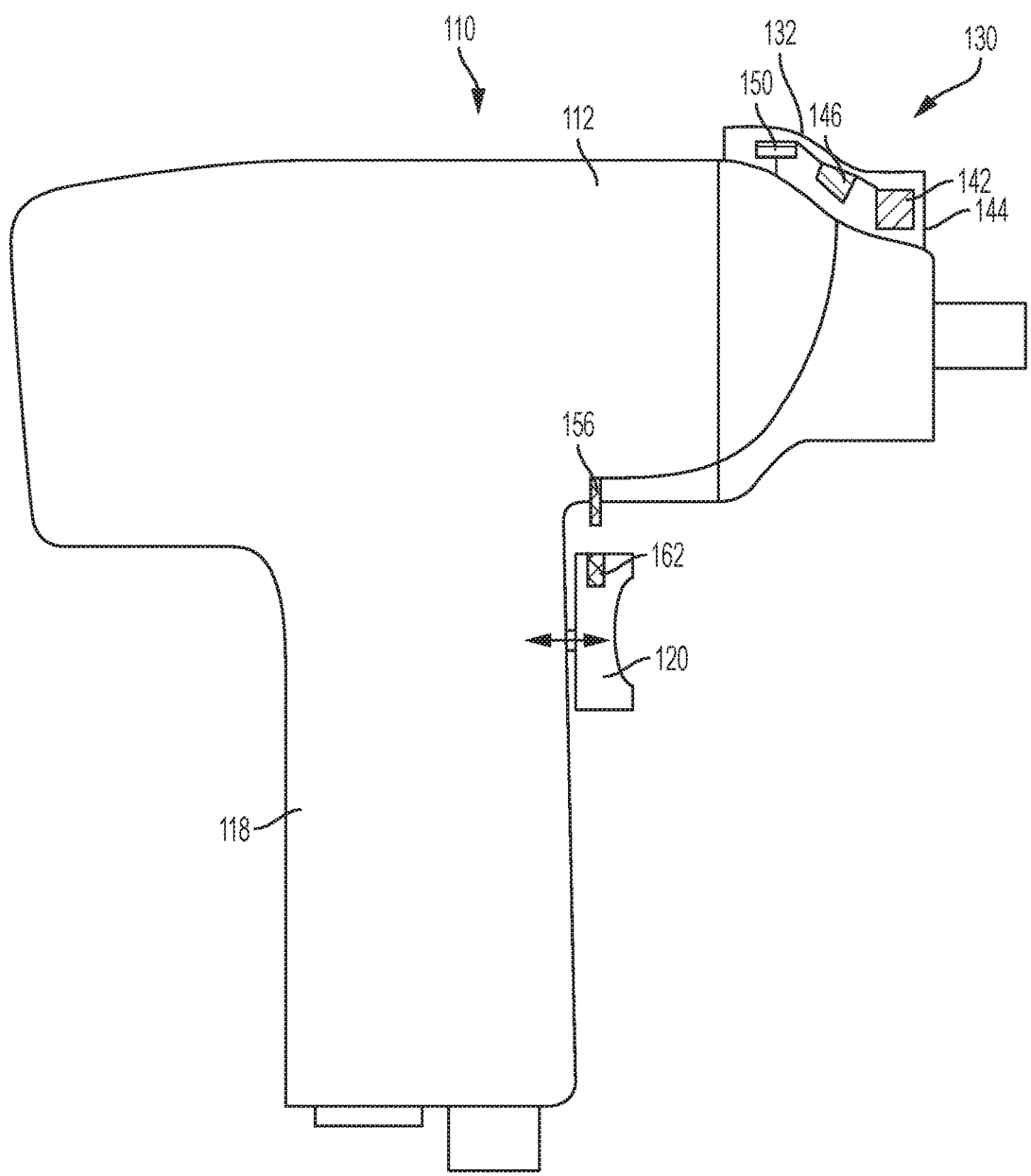
FIG. 5 is a side view of another embodiment of a power tool and a light unit.

FIG. 5 illustrates, another embodiment of a power tool 110, similar to the power tool 10, and a light unit 130, which may be integral with or removable from the power tool 110. The power tool 110 has a tool housing 112, a handle 118, and a switch or trigger 120 for actuating the tool. The light unit 130 includes a light unit housing 132 coupled to the top of the tool housing 112. The light unit housing 132 contains, a light 142 (e.g., one or more LEDs) covered by a lens or transparent or translucent cover 144 to protect the light 142 from dust and debris. The light unit housing 132 also contains a controller 146 (e.g., a processor, a microprocessor, and/or a control circuit) that controls power delivery to and illumination of the light 142 and other electrical circuit components (e.g., a DC power supply, various resistors, capacitors, diodes, and transistors, etc.) for controlling the light 142 and other light unit components, as will be well known to one of ordinary skill in the art. Received in the light unit housing 142 is a battery 150 that is configured to provide electrical power to the light 142. In the illustrated embodiment, the battery 150 is a rechargeable lithium ion battery. However, it should be understood that the battery 150 may be any type of rechargeable or non-rechargeable battery, such as a lithium-ion cylindrical cell, a nickel-cadmium battery, a coin cell, or an alkaline battery. Received in the tool housing 112 and electrically in communication with the controller 146 is a sensor 156, e.g., a Hall sensor. The switch or trigger 120 includes a sensor target 162, e.g., a permanent magnet, the position of which is sensed by the sensor 156. The sensor 156 senses movement of the sensor target 162, and thus of the switch or trigger 120, and communicates with the controller 146 to cause the light 142 to turn ON or OFF based on movement of the switch or trigger 120 and the sensor target 162 relative to the sensor 156, e.g., in the manner described above with respect to FIG. 4.

Figure 6:
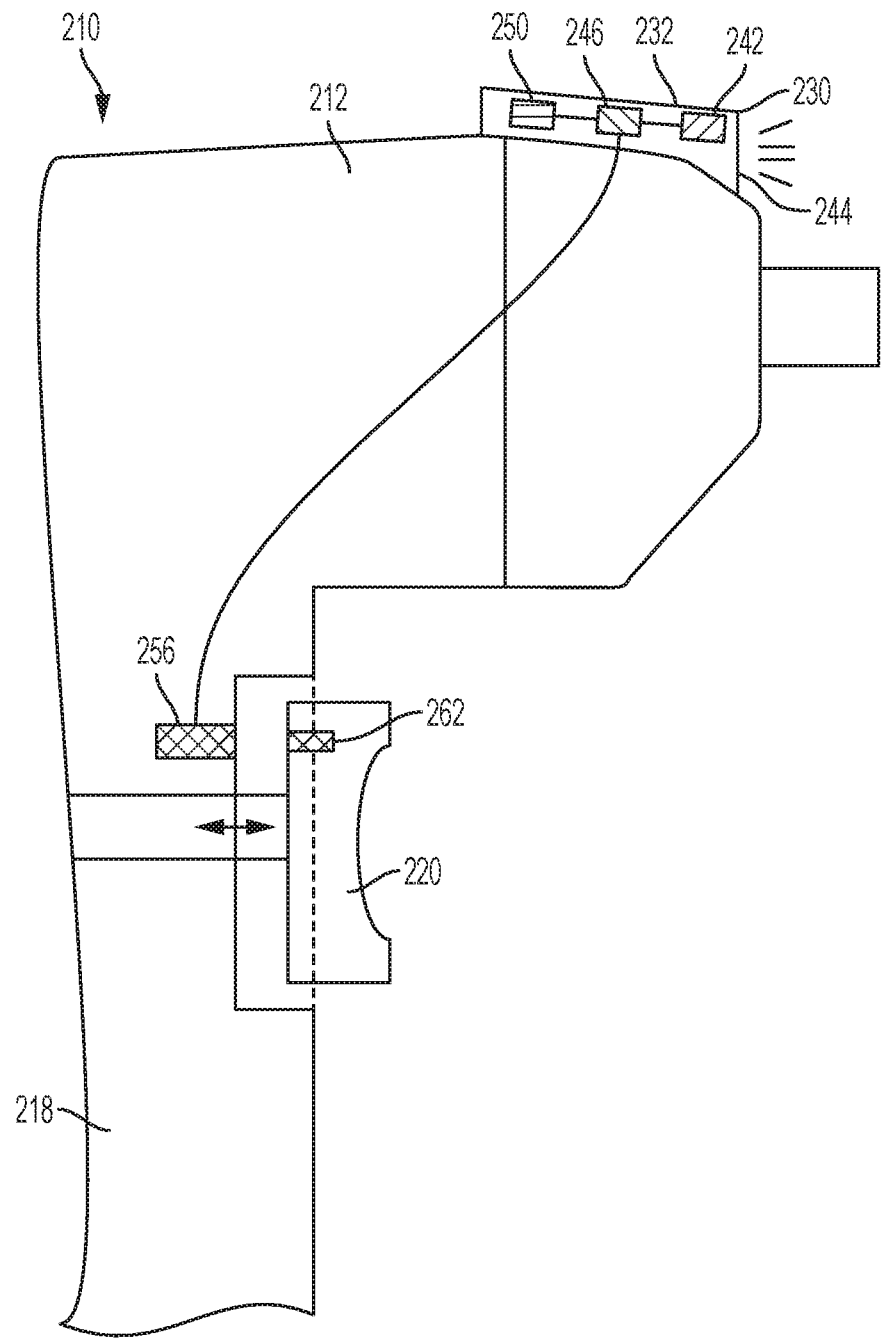
FIG. 6 is a side view of another embodiment of a power tool and a light unit.

FIG. 6 illustrates another embodiment of a power tool 210, similar to the power tools 10, 110, and a light unit 230, similar to light unit 130, which may be integral with or removable from the power tool 210. The power tool 210 has a tool housing 212, a handle 218, and a switch 220 for actuating the tool. The light unit 230 includes a light unit housing 232 coupled to the top of the tool housing 212. The light unit housing 232 contains a light 242 (e.g., one or more LEDs) covered by a lens or transparent or translucent cover 244 to protect the light 242 from dust and debris. The light unit housing 232 also contains a controller 246 (e.g., a processor, a microprocessor, and/or a control circuit) that controls power delivery to and illumination of the light 242 and other electrical circuit components (e.g., a DC power supply, various resistors, capacitors, diodes, and transistors, etc.) for controlling the light 242 and other light unit components, as will be well known to one of ordinary skill in the art. Received in the light unit housing 232 is a battery 250 that is configured to provide electrical power to the light 242. In the illustrated embodiment, the battery 250 is a rechargeable lithium ion battery. However, it should be understood that the battery 250 may be any type of rechargeable or non-rechargeable battery, such as a lithium-ion cylindrical cell, a nickel-cadmium battery, a coin cell, or an alkaline battery. Received in the tool housing 212 and electrically in communication with the controller 246 is a sensor 256, e.g., a Hall sensor. The switch 220 includes a sensor target 262, e.g., a permanent magnet, the position of which is sensed by the sensor 256. The sensor 256 and sensor target 262 differ from sensor 256 and sensor target 262 insofar as the sensor 256 is positioned behind the switch or trigger 210 and the sensor target 262 faces toward the sensor 256. The sensor 256 senses movement of the sensor target 262, and thus of the switch or trigger 220, and communicates with a controller to cause the light 242 to turn ON or OFF based on movement of the switch or trigger 220 and the sensor target 262 relative to the sensor 256, e.g., in the manner described above with respect to FIG. 4.

Figure 7A:
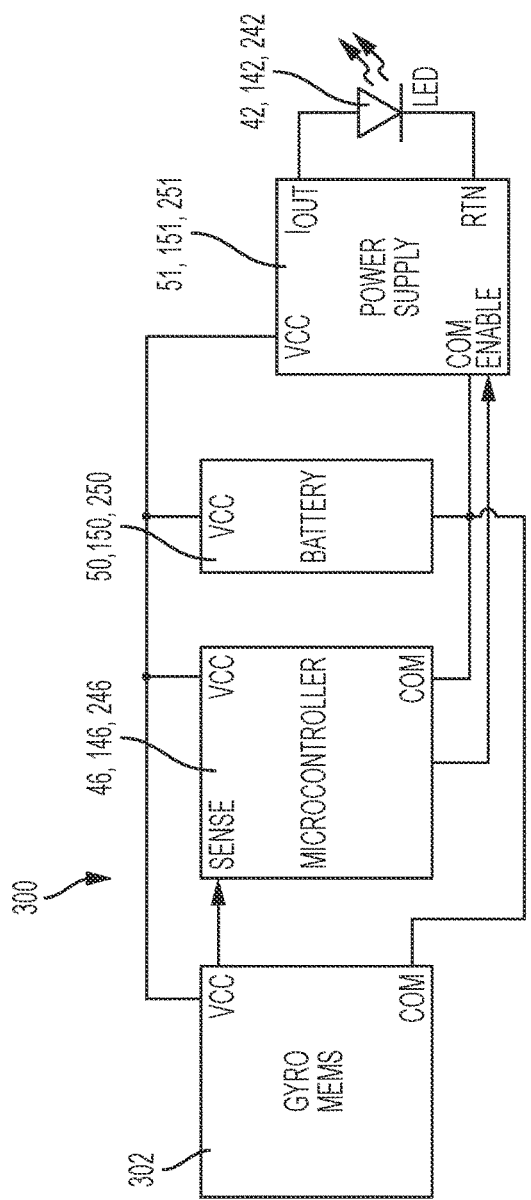
FIG. 7A is a circuit diagram of an embodiment of a motion control circuit for a light unit.
Figure 7B:
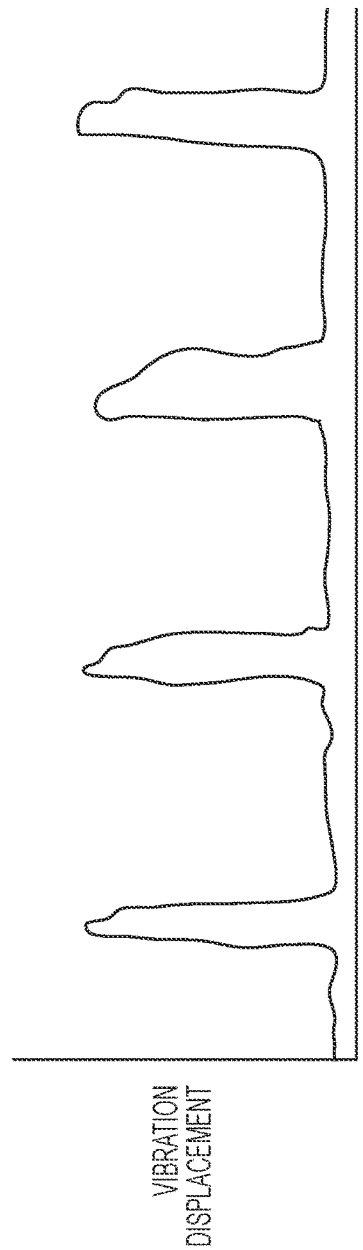
FIG. 7B is a graph illustrating, operation of the motion control circuit of FIG. 7A.

Referring to FIGS. 7A and 7B, in another embodiment, the light units 30, 130, 230 may additionally or alternatively be provided with a motion sensing circuit 300 for controlling operation of the lights 42, 142, 242. The motion sensing circuit 300 may include a motion sensor 302, e.g., a gyroscope and/or an accelerometer, which senses motion or vibration of the power tool 10, 110, 210. The motion sensor 302 may be powered by the battery 50, 150, 250 and provide a signal output to the controller 46, 146, 246 that corresponds to motion sensed by the motion sensor 302. Via a power supply 51, 151, 251, the controller 46, 146, 246 can control power deliver to and illumination of the light 42, 142, 242. For example, as shown in FIG. 7B, if the motion sensor 300 senses vibration of the tool 10, 110, 210 (e.g., due to impacting of an impact mechanism or due to user movement of the tool), the controller 46, 146, 246 can causes the light 42, 142, 242 to turn ON until the motion has subsided, or until a predetermined time period has elapsed. It should be understood that this motion sensing circuit 300 for controlling illumination of the light, unit could either supplement or replace the control of the light unit based on movement of the switch 20, 120, 220, as described above.

Referring to FIGS. 8A and 8B, in another embodiment, a power tool 410 and a light unit 430 (similar to the power tools 10, 110, 210 and light units 30, 130, 230) provide an alternative way of charging a battery 450 in the light unit 430. The power tool 410 includes a power tool housing 412 that includes a rear portion 414 containing a motor, a front portion 416 containing a transmission and/or impact mechanism, and a handle 418 extending downward from the rear portion 414. Positioned at a front end 415 of the rear portion 414 of the tool housing 412 are charging terminals 453, which are electrically connected to a charging circuit 451 for charging the battery 450. A charger 455 includes a cradle 459, one or more charging terminals 457 and a plug 461 configured to electrically connect the charger 455 to a source of electrical power, e.g., AC mains. The power tool 410 is receivable in the charger 455 with the front portion 416 of the tool housing 412 received in the cradle 459 at an angle, such that the charging terminals 453 of the power tool 410 mate with the charging terminals 457 of the charger 455. This provides a convenient way to recharge the battery 450 while storing the power tool 410.

Figure 9:
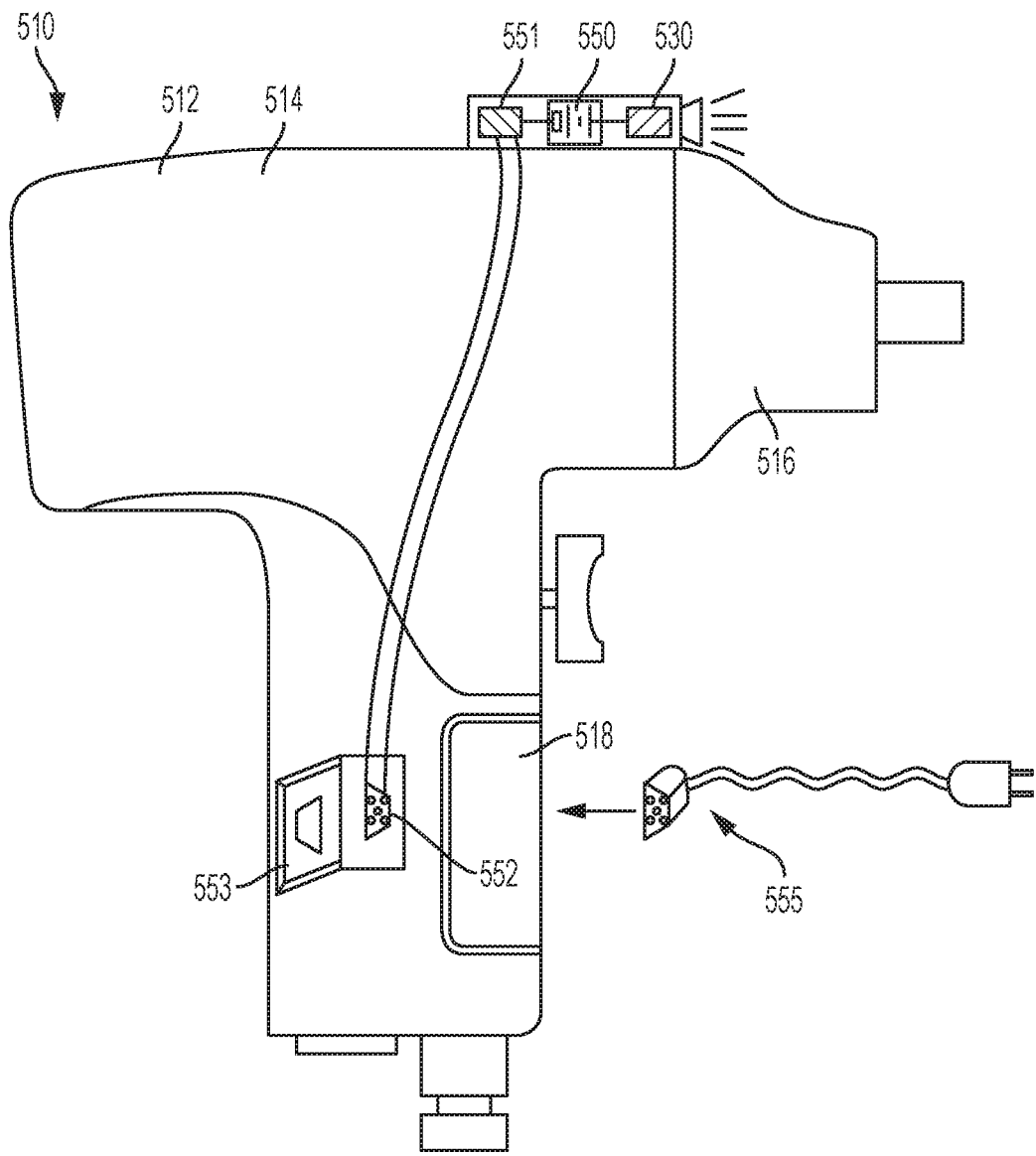
FIG. 9 is a side view of another embodiment of a power tool, a light unit, and a charger.

Referring to FIG. 9, in another embodiment, a power tool 510 and a light unit 530 (similar to the power tools 10, 110, 210, 410 and light units 30, 130, 230, 430) provides an alternative way of charging a battery 550 in the light unit 530. The power tool 510 includes a power tool housing 512 that includes a rear portion 514 containing a motor, a front portion 516 containing a transmission and/or impact mechanism, and a handle 518 extending downward from the rear portion 514. The handle 518 includes a charging port 552 (e.g., a USB or micro-USB port) that is electrically connected to a charging circuit 551 in the light unit 530 for charging the battery 550. When not in use, the charging port 552 is covered by a door 553 to protect the charging port 552 from dust and debris. The battery 550 can be charged by connecting a charging terminal, cable or wire (e.g., a USB or micro-USB cable 555) to the charging port 552, which enables the charging circuit 551 to control charging of the battery 550.

Figure 10:
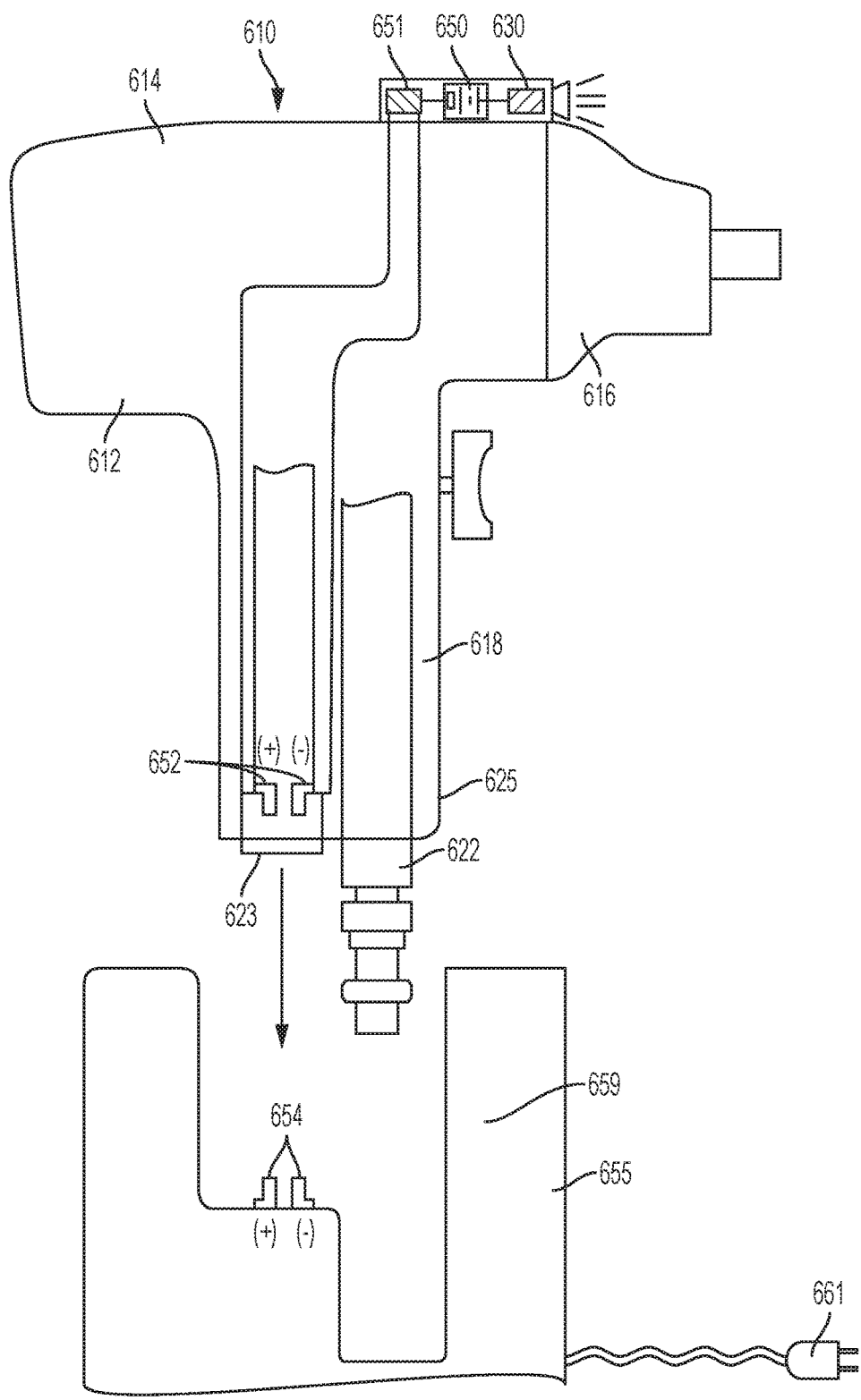
FIG. 10 is a side view of another embodiment of a power tool, a light unit, and a charger.

Referring to FIG. 10, in another embodiment, a power tool 610 and a light unit 630 (similar to the power tools 10, 110, 210, 410, 510 and light units 30, 130, 230, 430, 530) provides an alternative way of charging a battery 650 in the light unit 630. The power tool 610 includes a power tool housing 612 that includes a rear portion 614 containing a motor (not shown; in this case a pneumatic motor), a front portion 616 containing a transmission and/or impact mechanism (not shown), and a handle 618 extending downward from the rear portion 614. The handle includes an air inlet 622 and an air outlet 623. Adjacent the air outlet 623 (or the air inlet 622), at a base 625 of the handle 618, are one or more charging terminals 652 that are electrically connected to a charging circuit 651 for charging the battery 650. A charger 655 includes a cradle 659 configured to receive the base 625 of the handle 618. The charger 655 has one or more charging terminals 657 and a plug 661 configured to electrically connect the charger 655 to a source of electrical power, e.g., AC mains. The handle 618 of the power tool 610 is receivable in the cradle 659 with the charging terminals 652 of the power tool 610 mating with the charging terminals 657 of the charger 655. This provides a convenient way to recharge the battery 650 while storing the power tool 610.

Figure 11:
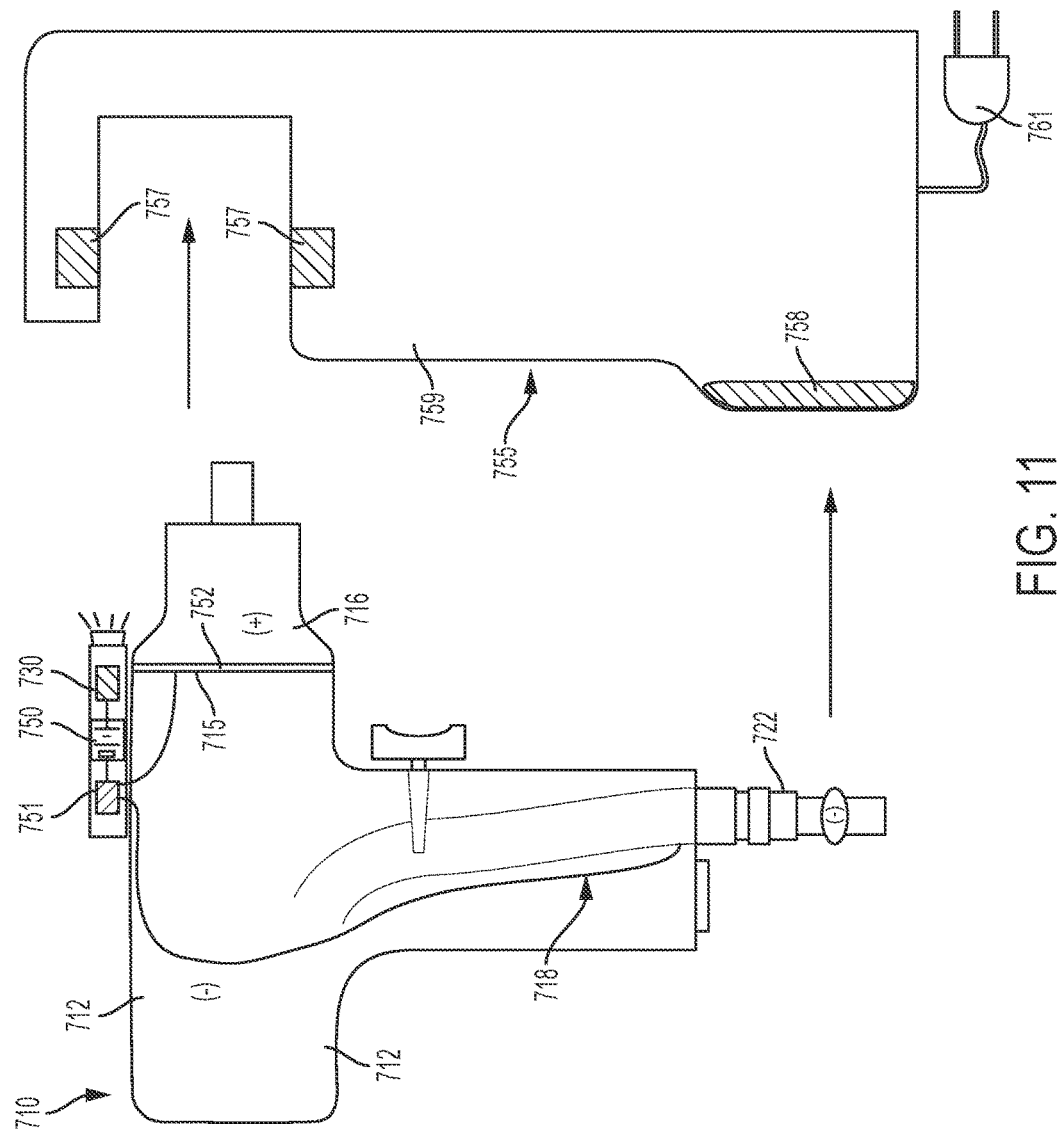
FIG. 11 is a side view of another embodiment of a power tool, a light unit, and a charger.

Referring to FIG. 11, in another embodiment, a power tool 710 and a light unit 730 (similar to the power tools 10, 110, 210, 410, 510, 610 and light units 30, 130, 230, 430, 530, 630) provides an alternative way of charging a battery 750 in the light unit 730. The power tool 710 includes a power tool housing 712 that includes a rear portion 714 containing a motor (not shown; in this case a pneumatic motor), a front portion 716 containing a transmission and/or impact mechanism (not shown), and a handle 718 extending, downward from the rear portion 714. Positioned at a front end 715 of the rear portion 714 of the tool housing 712 is an annular conductive band 752, which is electrically connected to one pole (e.g., positive) of the charging circuit 751 for charging the battery 750. The other pole (e.g., negative) of the charging circuit 751 is electrically connected to an air inlet 722, which is composed of a conductive material. A charger 755 includes a cradle 759, a first annular charging terminal 757 configured to mate with the conductive band 752, a second pad-shaped charging terminal 758 configured to mate with the air inlet 722, and a plug 761 configured to electrically connect the charger 755 to a source of electrical power, e.g., AC mains. The power tool 710 is receivable in the cradle 759 of the charger 755, such that the conductive band 752 mates with the annular charging terminal 757 and the air inlet 722 mates with the charging pad 758. This provide a convenient way to recharge the battery 750 while storing the power tool 710.

Figure 12A:
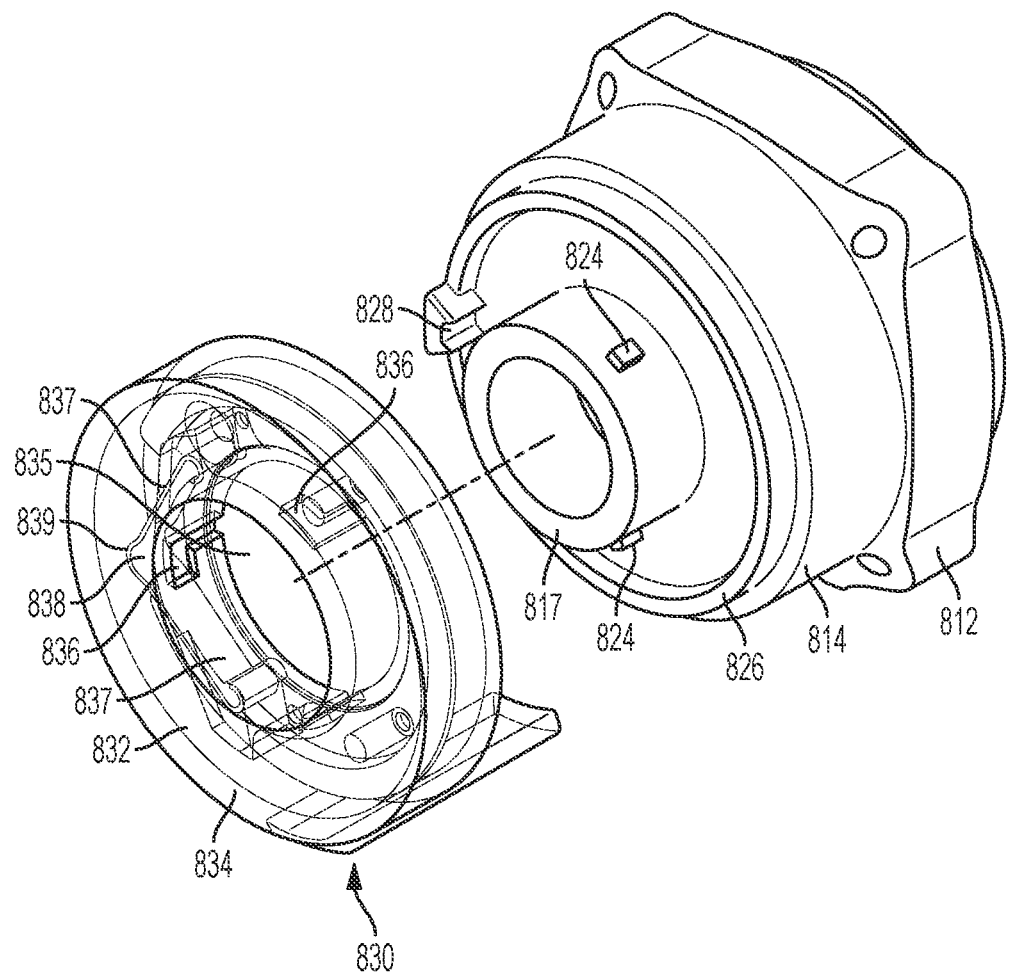
FIGS. 12A-12E are partially transparent, perspective views of an embodiment of a locking mechanism for a power tool and a light unit.
Figure 12C:
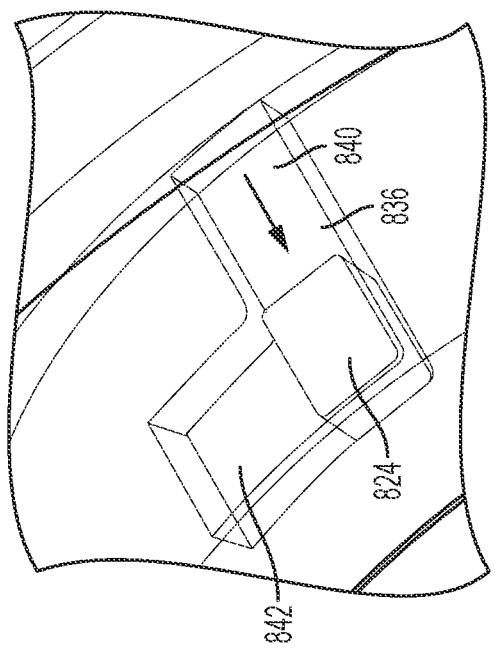
Figure 12B:
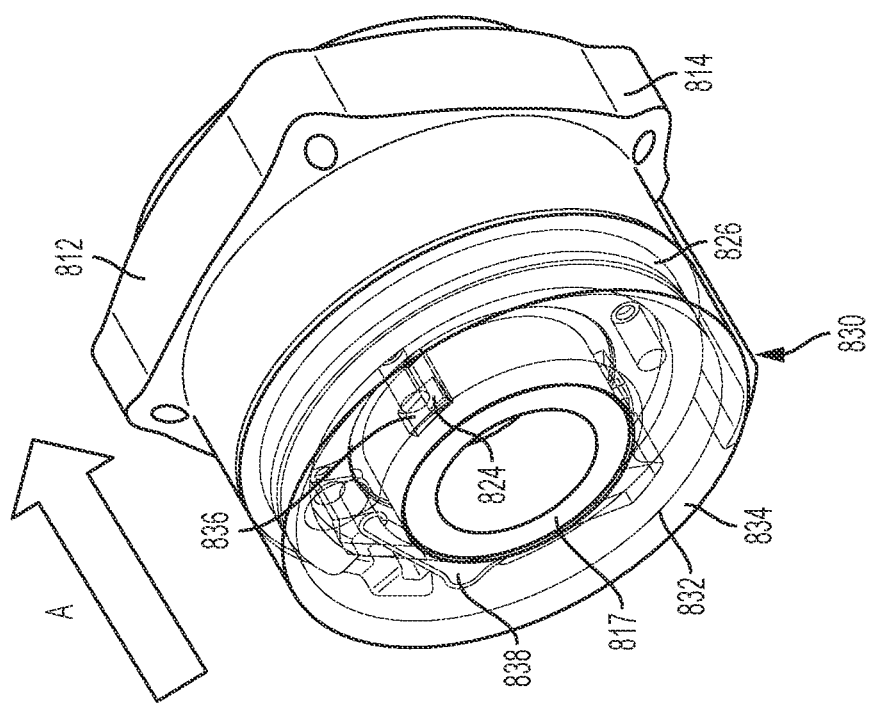
Figure 12E:
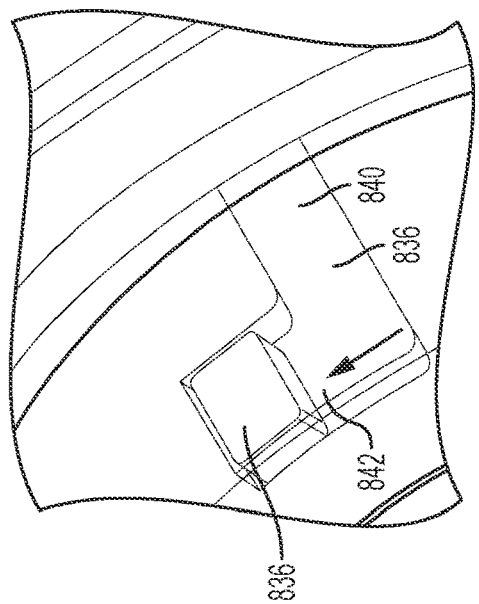
Figure 12D:
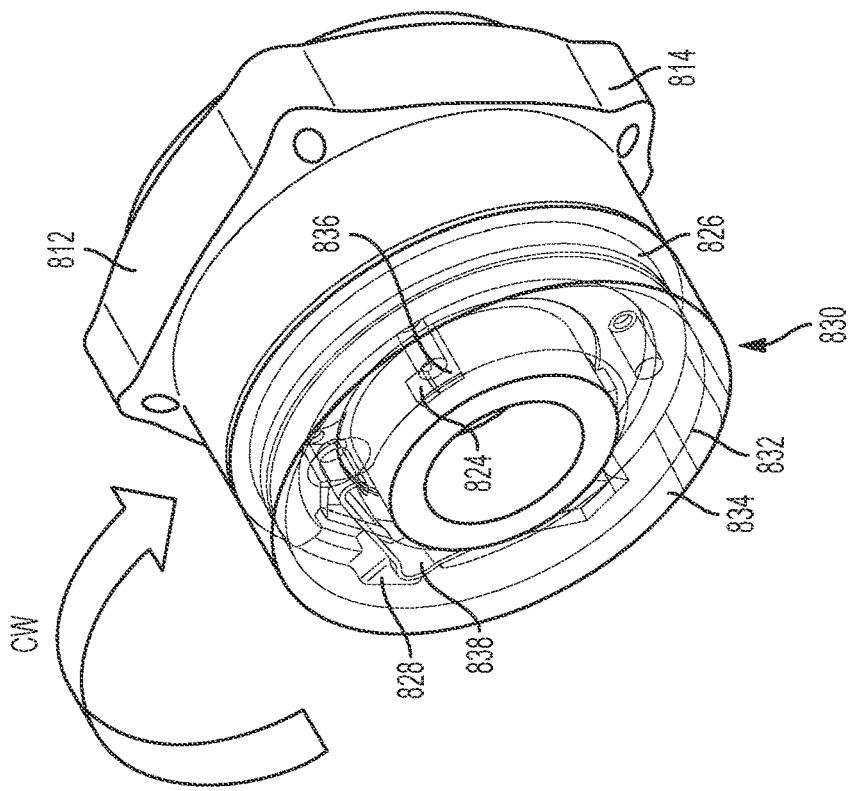
Figure 12G:
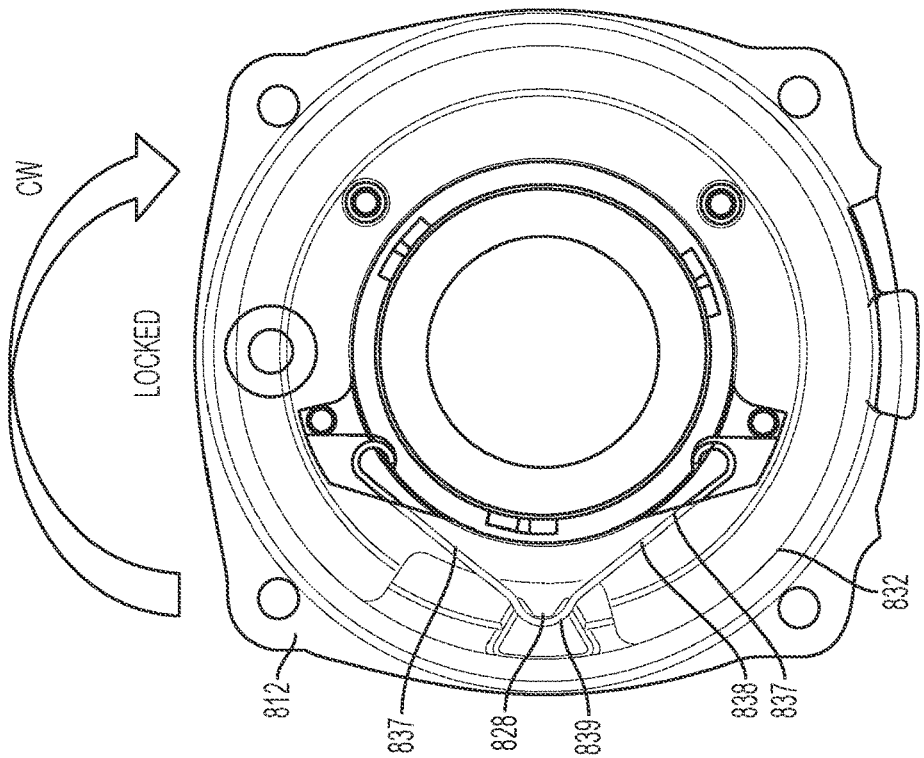
FIGS. 12F and 12G are end views of the locking mechanism of FIGS. 12A-12E.
Figure 12F:
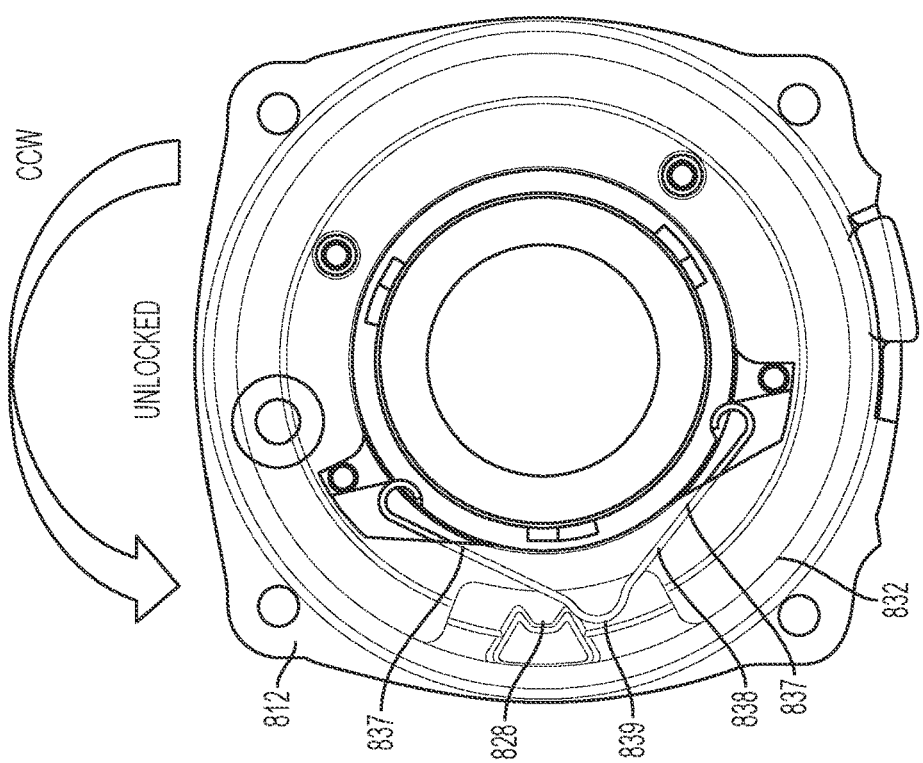

FIGS. 12A-12E illustrate an embodiment of a locking mechanism for removably and securely coupling a housing 832 of a light unit 830 (similar to housing 32 of light unit 30) to a front portion 814 and nosepiece 817 of a power tool housing 812 (similar to a front portion 16 and nosepiece 17 of power tool housing 12) using a bayonet-style attachment. The nosepiece 817 includes a radial projection 824, an annular outer rib support 826, and a locking recess 828. The light unit housing 832 includes an annular wall portion 834, a central opening 835 defining an interior L-shaped slot 836, and a V-shaped leaf spring 838 having two legs 837 joined at a curved vertex 839. As shown in FIGS. 12B-12C, to install the light unit 830 on the power tool housing 812, the annular wall portion 834 of the light unit housing 832 is received in an axial direction A over the outer rib support 826 with the radial projection 824 received in an axial portion 840 of the L-shaped slot 836. As shown in FIGS. 12D, 12E, 12F, and 12G, to secure the light unit 830 on the power tool housing 812, the light unit housing 832 is rotated in a clockwise direction CW relative to the power tool housing 812. This causes the radial projection 824 to be received in a circumferential portion 842 of the L-shaped slot 836, while, at the same time, the curved vertex 839 of the leaf spring 838 engages the locking recess 828. As shown in FIG. 12F, to remove the light unit 830 from the power tool housing 812, the light unit housing 832 is rotatable in a counterclockwise direction CCW to an unlocked position where the leaf spring 838 is disengaged from the locking recess 840 and the radial projection 824 is aligned with the axial portion 840 of the L-shaped slot 836 to facilitate removing the light unit housing 832 from the power tool housing 812.

FIGS. 13A-13G illustrate another embodiment of a locking mechanism for removably and securely coupling a housing 932 of a light unit 930 (similar to housing 32 of light unit 30) to a front portion 914 and nosepiece 917 of a power tool housing 912 (similar to a front portion 16 and nosepiece 17 of power tool housing 12) using a bayonet-style attachment. The nosepiece 917 includes a plurality of radial projections 924, an annular outer support rib 926, and a locking recess 928 defined in the support rib 926. The light unit housing 932 includes an annular wall portion 934 carrying a light 942 with a transparent cover 944. The annular wall portion 934 has an inner annular wall 940 that defines a central opening 935. A plurality of L-shaped slots 936 (one of which is shown) are also defined in the inner annular wall 940. Each L-shaped slot 936 includes an axial portion 937 and a circumferential portion 939. The annular wall portion 934 also has an outer annular wall 941 carries a locking button 946 that is biased radially outwardly by a compression spring 948. The locking button 946 includes a wide base portion 954, a narrow top portion 956, and a recessed portion 950 with a ramped surface 952 connecting the base portion 954 to the top portion 956.

Figure 13C:
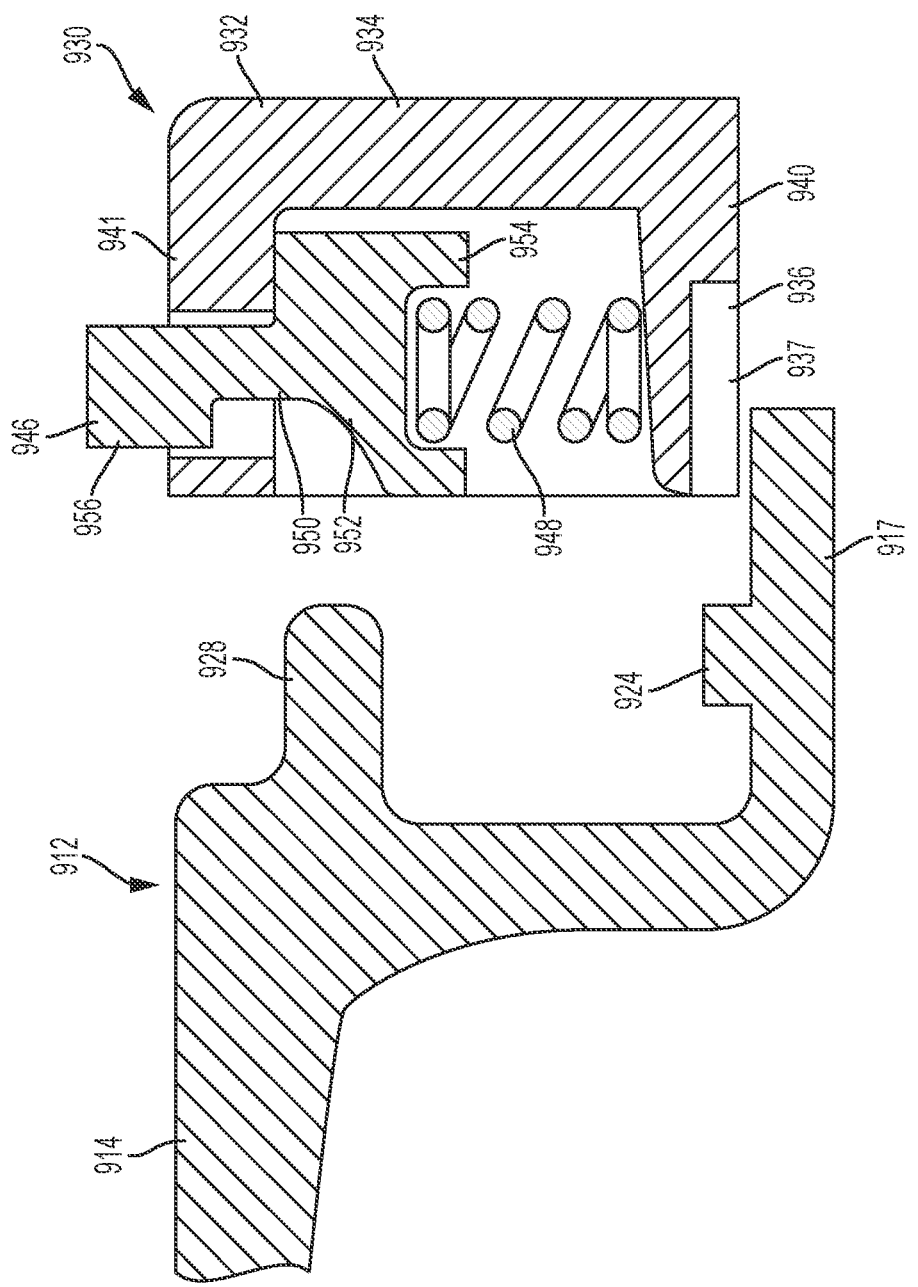

FIGS. 13C-13G illustrate installation and locking of the light unit 930 on the power tool housing 912. As shown in FIG. 13C, the light unit housing 932 is rotationally positioned relative to the power tool housing 912 so that the radial projections 924 on the nosepiece 917 are aligned with the axial portions 937 of the L-shaped slots 936 on the inner annular wall 940 of the light unit housing 932. As shown in FIGS. 13D-13E, the light unit housing 932 is moved in a direction A axially toward the power tool housing 912, so that the radial projections 924 are received in the axial portions 937 of the L-shaped slots 936 and the outer annular wall 941 is received around the support rib 926. At the same time, the support rib 926 engages the ramped surface 952 in the locking button 946, which pushes the locking button in a radially inward direction RI against the force of the spring 948. As shown in FIGS. 13F-13G, the user then rotates the light unit housing 932 in a clockwise direction CW so that the radial projections 924 are received in the circumferential portions 939 of the L-shaped slots 936. At the same time, the recessed portion 950 of the locking button 946 is aligned with the locking recess 928 in the support rib 926, removing the force that the support rib 926 exerts on the ramped surface 952 of the locking button 946. The biasing force of the spring 948 causes the locking button 946 to move in a radially outward direction RO so that the base portion 954 of the locking button 946 is caught in the locking recess 928 of the support rib 926, locking the light unit housing 932 on the power tool housing 912. To remove the light unit housing 932, the user depresses the locking button 946 in the radial inward direction RI against the force of the spring 948 and rotates the light unit housing 932 in a counterclockwise direction until the radial projections 924 are aligned with the axial portions 937 of the L-shaped slots 936. The user can then pull the light unit housing 932 axially away from the power tool housing 912 to remove the light unit housing 932 from the power tool housing 912.

Figure 14H:
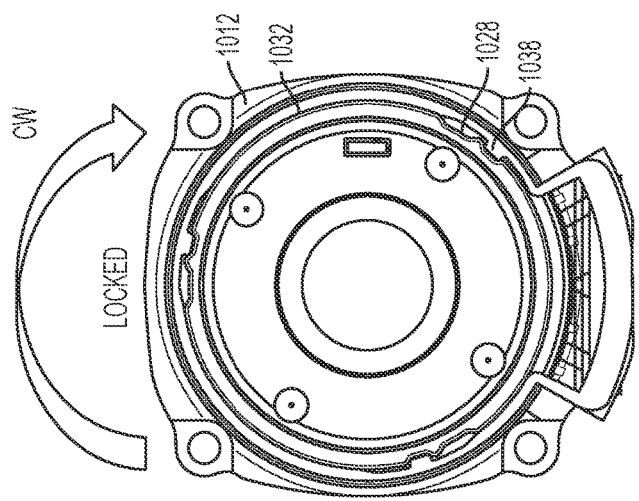
FIGS. 14F and 14H are end views of the locking mechanism of FIGS. 14A-14E.
Figure 14I:
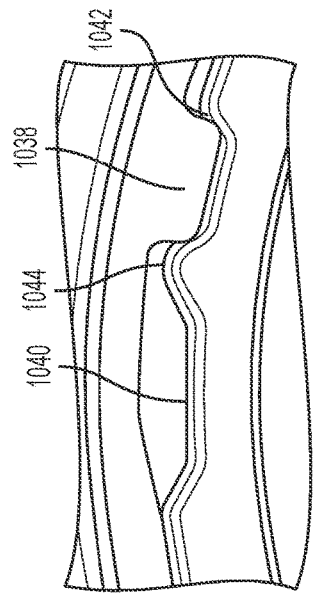
FIGS. 14G and 14I are close up views of the locking mechanism of FIGS. 14F and 14H.
Figure 14F:
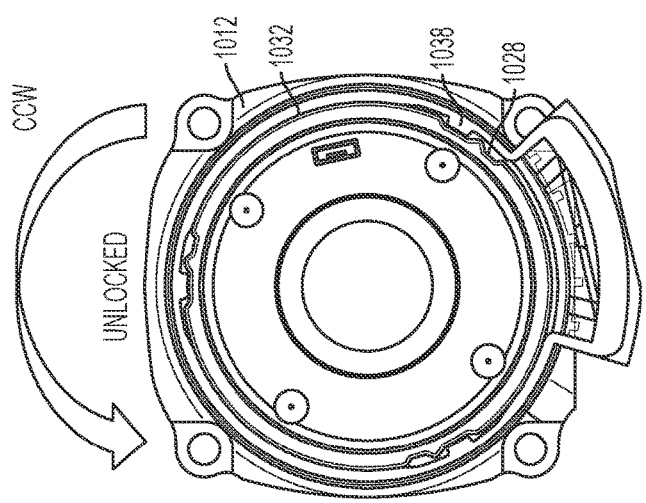
Figure 14G:
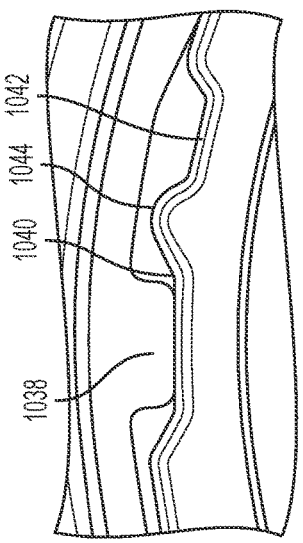

FIGS. 14A-14I illustrate another embodiment of a locking mechanism for removably and securely coupling a housing 1032 of a light unit 1030 (similar to housing 32 of light unit 30) to a front portion 1014 and nosepiece 1017 of a power tool housing 1012 (similar to a front portion 16 and nosepiece 17 of power tool housing 12) using a bayonet-style attachment. The nosepiece 1017 includes a plurality of radial projections 1024, an annular outer rib support 1026, and a plurality of locking features 1028 on the rib support 1026. As shown in FIG. 14E, each locking feature 1028 includes an elongated circumferential receiving recess 1040, a shorter circumferential locking recess 1042 and a tapered protrusion 1044 between the receiving recess 1040 and the locking recess 1042. The light unit housing 1032 includes an annular wall portion 1034 with a central opening 1035 defining a plurality of interior L-shaped slots 1036 defined in the central opening 1035 of the annular wall portion 1034. The interior of the annular wall portion 1034 also defines a plurality of resilient locking tabs 1038. As shown in FIGS. 14F and 14G, to install the light unit housing 1032 on the power tool housing 1012, the annular wall portion 1034 of the light unit housing 1032 is received in an axial direction over the outer rib support 1026 with the radial projections 1024 received in axial portions 1037 of the L-shaped slots 1036 and with locking tabs 1038 received in the receiving recesses 1040. As shown in FIGS. 14H and 14I, to secure the light unit housing 1032 on the power tool housing 1012, the light unit housing 1032 is rotated in a clockwise direction CW relative to the power tool housing 1012. This causes the radial projections 1024 to be received in circumferential portions 1039 of the L-shaped slots 1036, while, at the same time, the locking tabs 1038 deflect as they ride over the tapered protrusions 1044 until they are received in the locking recesses 1042. As shown in FIGS. 14F and 14G, the light unit housing 1032 is rotatable back to the unlocked position by rotating it in a counterclockwise direction CCW so that the locking tabs 1038 ride over the tapered protrusions 1044, causing the annular wall portion 1034 to deflect until the locking tabs 1038 are received in the receiving recesses 1040 and the radial projection 1024 is aligned with the axial portion 1037 of the L-shaped slot 1036. At this point, the light unit housing 1032 can be pulled axially off of the power tool housing 1012 to remove the light unit housing 1032 from the power tool housing 1012.

FIGS. 15A-15G illustrate another embodiment of a power tool 1110 (e.g., a pneumatic or electric power tool) and a removable light unit 1130, similar to the previously described embodiments of power tools and light units. The power tool 1110 and light unit 1130 differs from the previously described embodiments in the design of a sensor and sensor target for causing the light unit 1130 to turn ON when the switch or trigger of the power tool 1110 is actuated. In this embodiment, the power tool 1110 includes a power tool housing 1112 that includes a rear portion 1114 containing a motor (not shown), a front portion 1116 containing a transmission and/or impact mechanism (not shown), and a smaller diameter nose portion 1117 extending forward from the front portion 1116. An output member 1119 (in this case a square drive shaft) is driven by the motor and the transmission and/or impact mechanism and extends outward from the nose portion 1117 of the power tool housing 1112 along an axis X. A handle 1118 extends downward from the power tool housing 1112 and includes a switch or trigger 1120 configured to be depressed by a user to control the motor.

The light unit 1130 includes a light unit housing 1132 having an annular portion 1134 with a central opening 1136 concentric with the axis X, and a flange portion 1138 extending rearward from the annular portion 1134 toward the tool housing 1112, parallel to and offset from the axis X. Received in the flange portion 1138 are a battery 1161 and a controller 1146 (e.g., a control circuit, a microprocessor, or a microcontroller). Received in the annular portion 1134 is a light 1142 that is electrically connected to the battery 1161 and the controller 1146. The light unit housing 1132 is removably coupleable to the tool housing 1112 with the annular portion 1134 receivable over the nose portion 1117 and the flange portion 1138 disposed below the front portion 1116 and adjacent the switch 1120, between the front portion 1116 and the switch or trigger 1120. The light unit housing 1132 may be lockably coupled to the tool housing 1112, e.g., according to one or more of the embodiments described above.

Figure 15F:
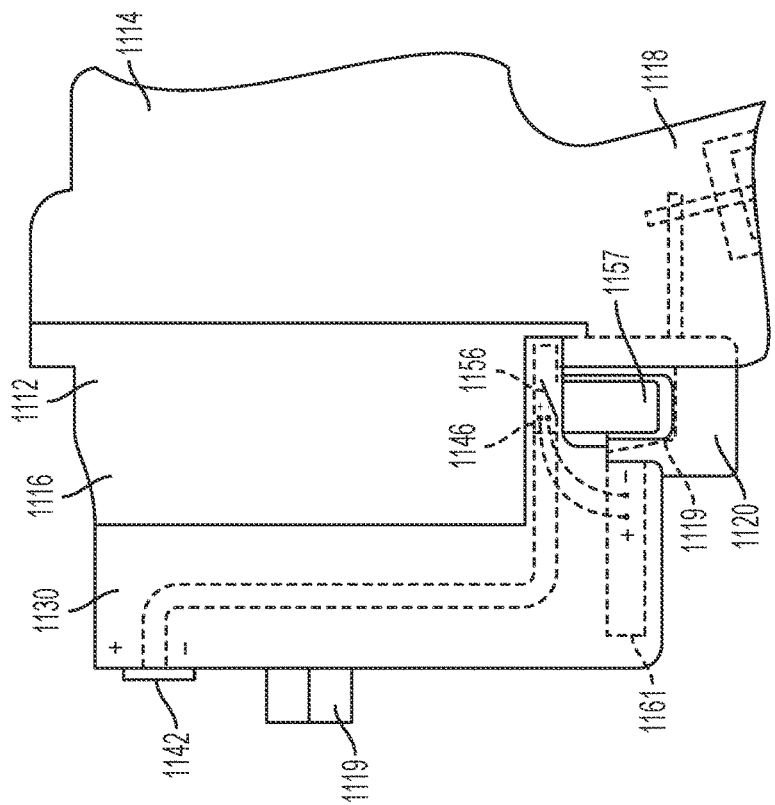
Figure 15E:
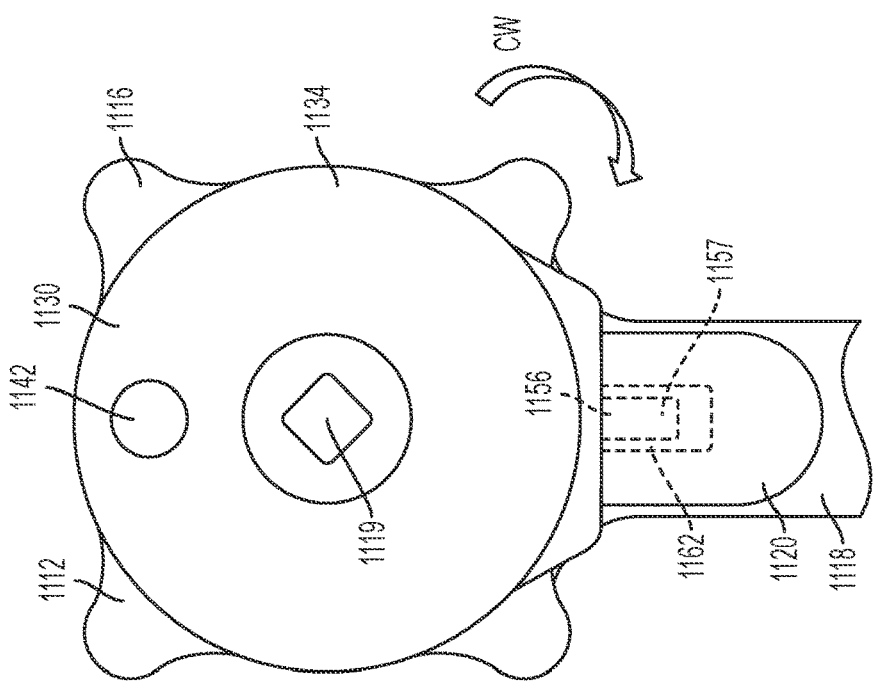

A sensor in the form of a toggle or pressure switch 1156 is located in the flange portion 1138 and is coupled to the controller 1146. The toggle or pressure switch 1156 is configured to sense movement of the switch or trigger 1120 of the power tool 1110. The switch or trigger 1120 includes a sensor target in the form of a recess 1162 that receives an arm 1157 of the toggle or pressure switch 1156. The recess 1162 is open to one side of the switch or trigger 1120 to facilitate receiving the arm 1157 in the recess 1162 when the light unit housing 1132 is installed on the power tool housing 1112 using one of the bayonet-type connections described above. As shown in FIGS. 15A-15D, when the light unit housing 1132 is moved axially toward the power tool housing 1112, the arm 1157 is rotationally misaligned with the switch or trigger 1120. As shown in FIGS. 15E-15F, when the light unit housing 1132 is the rotated in a clockwise direction CW to lock the light unit housing 1132 on the power tool housing 1112, the arm 1157 of the toggle or pressure switch 1156 slides into the recess 1162 in the switch or trigger 1120.

Figure 15H:
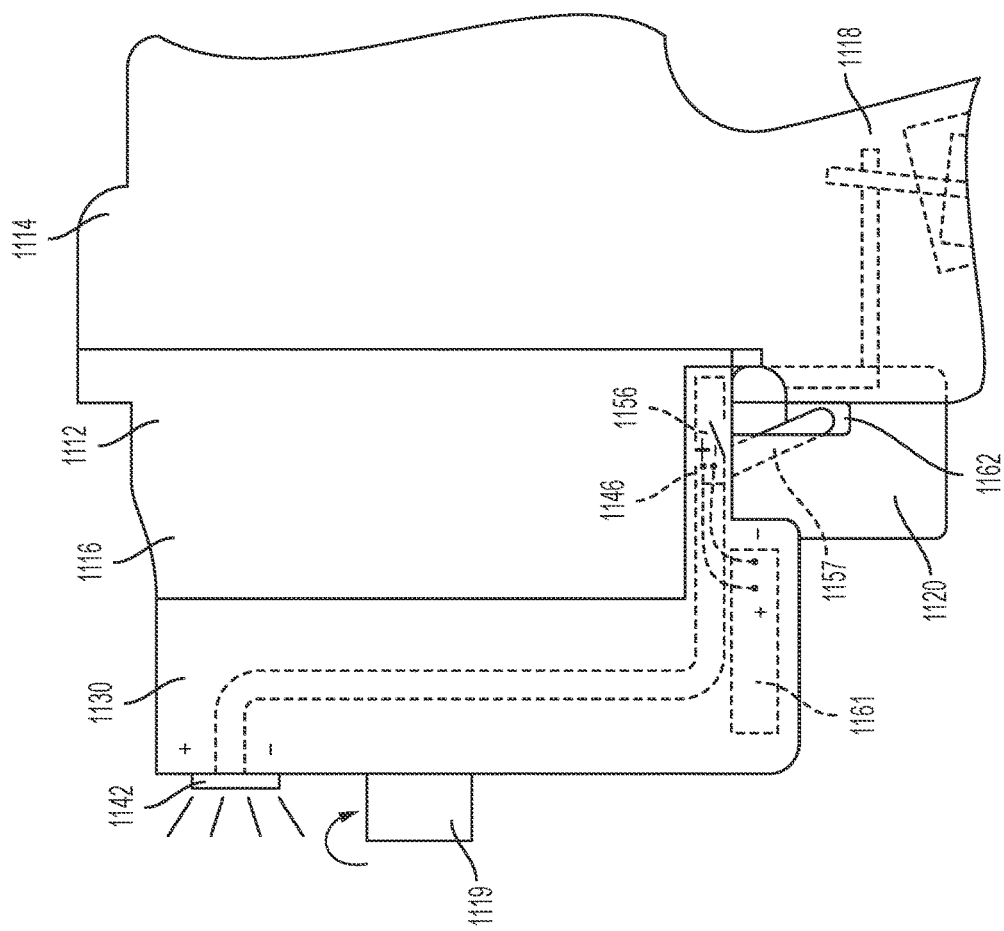
Figure 15G:
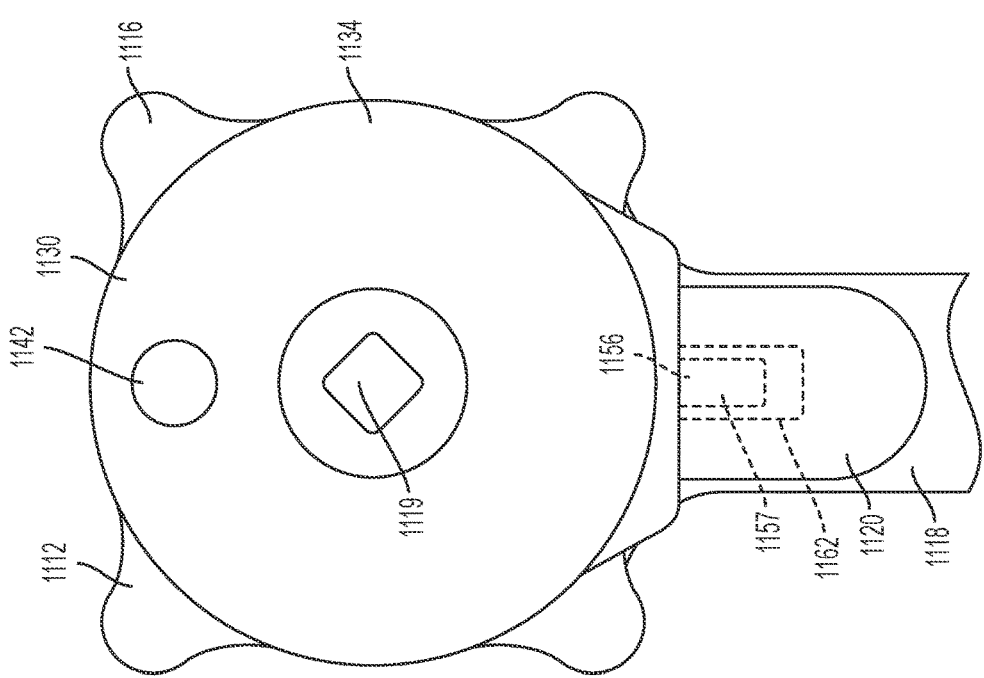

As shown in FIGS. 15G-15H, the toggle or pressure switch 1156 is configured to sense the position of the switch or trigger 1120 by moving axially toward the tool housing 1112 as the switch or trigger 1120 is moved from a fully deactivated position to a partially or fully activated position. Depressing the switch or trigger 1120 causes the arm 1157 to pivot toward the power tool housing 1112, which causes the toggle or pressure switch 1156 to close. In one embodiment, when the switch or trigger 1120 is actuated a small distance, the power tool motor remains OFF or rotates at a very low speed, while the toggle or pressure switch 1156 closes, and the controller 1146 causes the light 1142 to turn ON. When the switch or trigger 1120 is actuated a larger distance, the toggle or pressure switch 1156 remains closed so that the light 1142 remains ON, while the motor is activated to run at a faster or full speed. The motor and the light remain ON until the switch or trigger 1120 is deactivated or released. In an alternative embodiment, the controller 1146 may have or be programmed with a timer that causes the light to remain ON for a predetermined period of time after the switch 1120 has been actuated or deactivated. Examples of such timer features can be found in, e.g., U.S. Pat. Nos. 6,511,200 and 9,225,275, which are incorporated by reference.

Figure 16A:
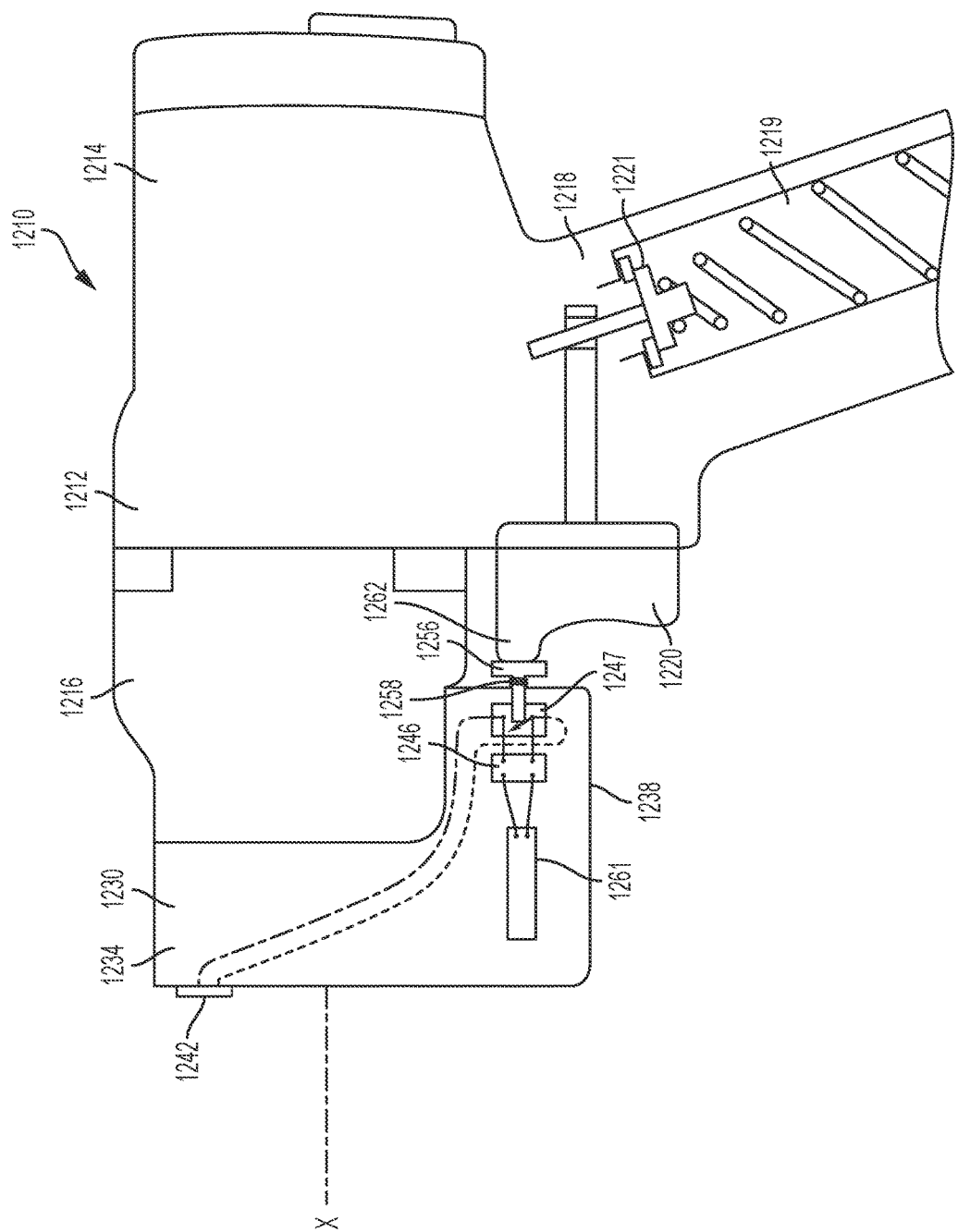
FIGS. 16A-16B are side views, partially in cross section, of another embodiment of a power tool and a light unit.
Figure 16B:
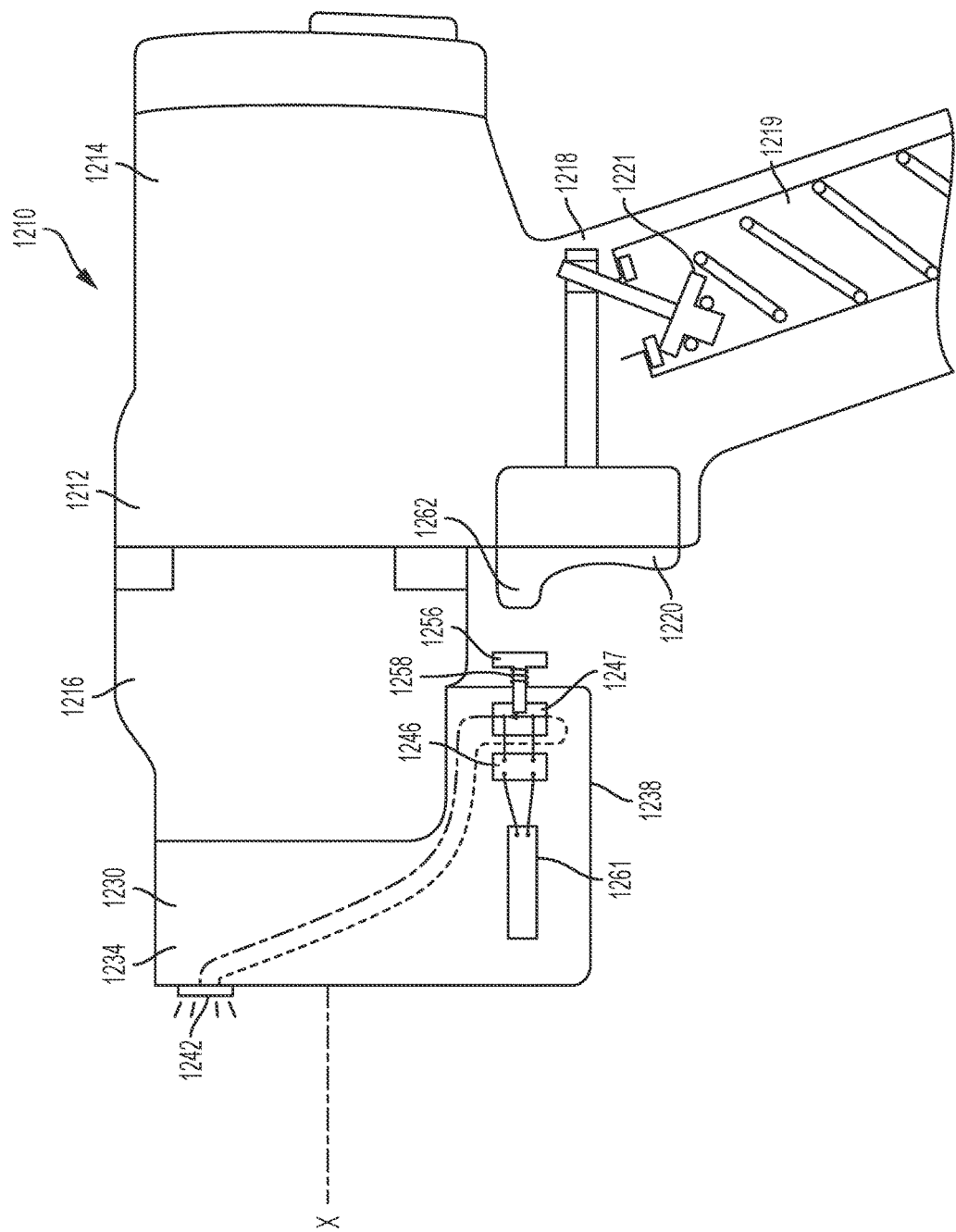

FIGS. 16A-16B illustrate another embodiment of a power tool 1210 (e.g., a pneumatic or electric power tool) and a removable light unit 1230, similar to the previously described embodiments of power tools and light units. The power tool 1210 and light unit 1230 differ from the previously described embodiments in the design of a sensor and sensor target for causing the light unit 1230 to turn ON when the switch or trigger of the power tool 1210 is actuated. In this embodiment, the power tool 1210 includes a power tool housing 1212 that includes a rear portion 1214 containing a motor (not shown), a front portion 1216 containing a transmission and/or impact mechanism (not shown), and a smaller diameter nose portion (not shown) extending forward from the front portion 1216. An output member (not shown, e.g., a square drive shaft) is driven by the motor and the transmission and/or impact mechanism and extends outward from the nose portion of the power tool housing 1212 along an axis X. A handle 1218 extends downward from the power tool housing 1212 and includes an inlet passageway 1219 for delivering compressed air to the motor. A switch or trigger 1220 is coupled to the handle 1218 and is linked to a valve 1221 in the inlet passageway 1219. As shown in FIG. 16B, the switch or trigger 1220 can be actuated or depressed, which opens the valve 1221 to deliver air to the motor.

The light unit 1230 includes a light unit housing 1232 having an annular portion 1234 concentric with the axis X, and a flange portion 1238 extending rearward from the annular portion 1234 toward the tool housing 1212, parallel to and offset from the axis X. Received in the flange portion 1238 are a battery 1261, a controller 1246 (e.g., a control circuit, a microprocessor, or a microcontroller), and a make or break electrical switch 1247. Received in the annular portion 1234 is a light 1242 that is electrically connected to the battery 1261 and the controller 1246 via the make or break switch 1247. The light unit housing 1232 is removably coupleable to the tool housing 1212 with the annular portion 1234 receivable over the nose portion and the flange portion 1238 disposed below the front portion 1216 and adjacent the switch or trigger 1220. The light unit housing 1232 may be lockably coupled to the tool housing 1212, e.g., according to one or more of the embodiments described above.

A sensor in the form of a toggle or pressure switch 1256 extends rearward from the flange portion 1238 and is biased in the rearward direction by a compression spring 1258. The toggle switch 1256 is coupled to the make or break switch 1247, such that rearward movement of the toggle or pressure switch 1256 causes the make or break switch 1247 to close. The switch or trigger 1220 includes a sensor target in the form of a protrusion 1262 on the front of the toggle or pressure switch 1256 that abuts the toggle or pressure switch 1256. The toggle or pressure switch 1256 is configured to sense the position of the switch or trigger 1220 by moving axially toward the tool housing 1212, under the biasing force of compression spring 1258, as the switch or trigger 1220 is moved from a deactivated position (shown in FIG. 16A) to a partially or fully activated position (shown in FIG. 16B). Depressing the switch or trigger 1220 allows the toggle or pressure switch 1256 to move axially toward the power tool housing 1212, which causes the make or break switch 1247 to close. In one embodiment, when the switch or trigger 1220 is actuated a small distance, the power tool motor remains OFF or rotates at a very low speed, while the toggle or pressure switch 1256 moves enough to allow the make or break switch 1247 to close, and the controller 1246 causes the light 1242 to turn ON. When the switch or trigger 1220 is actuated a larger distance, the toggle or pressure switch 1256 remains biased rearward so that the make or break switch 1247 is closed, and the light 1242 remains ON, while the motor is activated to run at a faster or full speed. The motor and the light 1242 remain ON until the switch or trigger 1220 is deactivated or released, pushing the toggle or pressure switch 1262 axially forward against the force of compression spring 1258, causing the make or break switch 1247 to open. In an alternative embodiment, the controller 1246 may have or be programmed with a timer that causes the light 1242 to remain ON for a predetermined period of time after the switch 1220 has been actuated or deactivated. Examples of such timer features can be found in, e.g., U.S. Pat. Nos. 6,511,200 and 9,225,275, which are incorporated by reference.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second" and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of the following claims.

What is claimed is:

1. A light unit for a tool comprising:
   a light unit housing removably coupleable to a tool housing;
   a light disposed in the light unit housing; and
   a sensor disposed in the light unit housing and configured to sense actuation of the tool by a user to perform an operation; and
   a controller coupled to the sensor and the light and configured to cause the light to turn ON when the sensor senses that the tool is actuated.

2. The light unit of claim 1, wherein the light unit housing is removably coupled to the tool housing by a bayonet connection so that the light unit housing is rotatable between an unlocked position and a locked position.

3. The light unit of claim 2, wherein the light unit housing further comprises a locking mechanism configured to maintain the light unit housing in the locked position.

4. The light unit of claim 3, wherein the locking mechanism comprises at least one of a leaf spring, a locking tab, and a button configured to be received in a recess.

5. The light unit of claim 1, wherein the sensor comprises a Hall sensor configured to sense movement of a magnet coupled to the switch of a tool.

6. The light unit of claim 1, wherein the sensor comprises a toggle switch or a pressure switch configured to sense movement of the switch of the tool.

7. The light unit of claim 1, wherein the sensor comprises a motion sensor configured to sense a motion initiated by actuation of the tool.

8. The light unit of claim 1, wherein the controller includes a timer configured to keep the light ON for a predetermined time period after the switch has been actuated or deactivated.

9. The light unit of claim 1, further comprising a battery disposed in the light unit housing and configured to power the light, the sensor, and the controller.

10. The light unit of claim 8, further comprising a USB port or one or more electrical contacts configured to provide power for recharging the battery.

11. A light unit for a pneumatic tool comprising:
    a housing coupleable to a pneumatic tool;
    a light disposed in the housing; and
    a sensor disposed in the housing and configured to sense actuation of a switch on the tool by a user to control delivery of fluid to the pneumatic tool; and
    a controller coupled to the sensor and the light and configured to cause the light to turn on when the sensor senses that the switch is actuated.

12. The light unit of claim 11, wherein the light unit housing is removably coupled to the tool housing by a bayonet connection so that the light unit housing is rotatable between an unlocked position and a locked position.

13. The light unit of claim 12, wherein the light unit housing further comprises a locking mechanism configured to maintain the light unit housing in the locked position, the locking mechanism comprising at least one of a leaf spring, a locking tab, and a button configured to be received in a recess.

14. The light unit of claim 11, wherein the sensor comprises a Hall sensor configured to sense movement of a magnet coupled to the switch of a tool.

15. The light unit of claim 11, wherein the sensor comprises a toggle switch or a pressure switch configured to sense movement of the switch of the tool.

16. The light unit of claim 11, further comprising a battery disposed in the light unit housing and configured to power the light, the sensor, and the controller.

17. A pneumatic tool comprising:
    a tool housing;
    a pneumatic motor disposed in the tool housing;
    a switch coupled to the tool housing and configured to control delivery of fluid to the pneumatic motor;
    a sensor target coupled for movement with the switch;
    a light unit housing coupleable to the tool housing;
    a light disposed in the light unit housing;
    a sensor disposed in the housing and configured to sense actuation of the switch; and
    a controller coupled to the sensor and the light and configured to cause the light to turn on when the sensor senses that the switch is actuated.

18. The pneumatic tool of claim 17, wherein the light unit housing is removably coupled to the tool housing by a bayonet connection.

19. The pneumatic tool of claim 17, wherein the sensor comprises a Hall sensor and the sensor target comprises a magnet.

20. The pneumatic tool of claim 17, wherein the sensor comprises a toggle switch or a pressure switch and the sensor target comprises a portion of the switch that engages the toggle switch or the pressure switch.

* * * * *